(12) United States Patent
Uemura et al.

(10) Patent No.: US 10,017,221 B2
(45) Date of Patent: Jul. 10, 2018

(54) TWO-WHEELED MOTOR VEHICLE SEAT DEVICE

(71) Applicant: TS TECH CO., LTD., Asaka-Shi, Saitama (JP)

(72) Inventors: Tetsuo Uemura, Tochigi (JP); Minoru Takabayashi, Tochigi (JP); Hideki Tokumoto, Tochigi (JP); Kosuke Maeda, Tochigi (JP); Kazuhiro Tsurumi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/501,296

(22) PCT Filed: Jul. 23, 2015

(86) PCT No.: PCT/JP2015/070927
§ 371 (c)(1),
(2) Date: Feb. 2, 2017

(87) PCT Pub. No.: WO2016/021414
PCT Pub. Date: Feb. 11, 2016

(65) Prior Publication Data
US 2017/0217523 A1 Aug. 3, 2017

(30) Foreign Application Priority Data

Aug. 5, 2014 (JP) .................... 2014-159264

(51) Int. Cl.
*A47C 7/74* (2006.01)
*B60N 2/02* (2006.01)
(Continued)

(52) U.S. Cl.
CPC . *B62J 1/28* (2013.01); *B62J 1/12* (2013.01); *B62J 33/00* (2013.01)

(58) Field of Classification Search
CPC ................. B62J 1/28; B62J 33/00; B62J 1/12
(Continued)

(56) References Cited

U.S. PATENT DOCUMENTS 4,030,750 A * 6/1977 Abram ........................ B62J 1/28
297/215.12 X
4,032,189 A * 6/1977 Benavente ................ B62J 1/28
297/215.12 X
(Continued)

FOREIGN PATENT DOCUMENTS

JP H09-011953 A 1/1997
JP 2001-213372 A 8/2001
(Continued)

*Primary Examiner* — Rodney B White
(74) *Attorney, Agent, or Firm* — Carrier Blackman & Associates, P.C.; Joseph P. Carrier; Jingli Wang

(57) ABSTRACT

A two-wheeled motor vehicle seat device with a backrest provided on a seat main body so as to be movable in a fore-and-aft direction is provided in which the backrest is provided on the seat main body mounted on a vehicle body so that the backrest can move in a fore-and-aft direction thereof, a heater is incorporated into the backrest, and a harness connected to the heater is passed through an interior of the seat main body and connected to a power supply. This enables the heater to be incorporated into the backrest to heat the backrest without interfering with the fore-and-aft movement of the backrest.

16 Claims, 35 Drawing Sheets

(51) Int. Cl.
    *B60N 2/22*     (2006.01)
    *B62J 1/00*     (2006.01)
    *B62J 1/28*     (2006.01)
    *B62J 33/00*     (2006.01)
    *B62J 1/12*     (2006.01)

(58) Field of Classification Search
    USPC ......... 297/180.1–180.16, 215.1–215.14, 383
    See application file for complete search history.

(56) References Cited

U.S. PATENT DOCUMENTS

| | | | | |
|---|---|---|---|---|
| 4,466,660 A * | 8/1984 | Mabie | ............ | B62J 1/28 |
| | | | | 297/215.12 X |
| 4,563,038 A * | 1/1986 | Hirose | ............ | B62J 1/12 |
| | | | | 297/215.11 X |
| 4,776,632 A * | 10/1988 | Akimori | ............ | B62J 1/12 |
| | | | | 297/215.12 |
| 5,026,119 A * | 6/1991 | Frank | ............ | B62J 1/28 |
| | | | | 297/215.12 X |
| 5,441,330 A * | 8/1995 | Rojas | ............ | B62J 1/28 |
| | | | | 297/195.12 X |
| 7,011,240 B2 * | 3/2006 | Kan | ............ | B62J 7/04 |
| | | | | 297/215.12 X |
| 7,070,234 B1 * | 7/2006 | Pravettone | ............ | B62J 1/28 |
| | | | | 297/215.12 X |
| 7,380,629 B2 * | 6/2008 | Vaisanen | ............ | B62J 1/12 |
| | | | | 297/215.14 X |
| 7,950,736 B2 * | 5/2011 | Olson | ............ | B60N 2/40 |
| | | | | 297/215.14 X |
| 8,567,861 B2 * | 10/2013 | Matsushima | ............ | B60N 2/5685 |
| | | | | 297/180.12 |
| 8,757,713 B2 * | 6/2014 | Reinhardt | ............ | B62J 1/28 |
| | | | | 297/215.12 X |
| 2005/0110311 A1 * | 5/2005 | Tseng | ............ | B62J 1/28 |
| | | | | 297/215.12 |
| 2005/0206204 A1 * | 9/2005 | Ogawa | ............ | B62J 1/08 |
| | | | | 297/215.14 |
| 2015/0197298 A1 * | 7/2015 | Sasaki | ............ | B62J 1/12 |
| | | | | 297/215.14 |
| 2016/0200381 A1 * | 7/2016 | Lorbiecki | ............ | B62J 1/14 |
| | | | | 297/215.14 X |

FOREIGN PATENT DOCUMENTS

| | | |
|---|---|---|
| JP | 2001-315678 A | 11/2001 |
| JP | 2004-243822 A | 9/2004 |
| JP | 2005-125903 A | 5/2005 |
| JP | 2005-279070 A | 10/2005 |
| JP | 3812295 B2 | 8/2006 |
| JP | 2011-255827 A | 12/2011 |
| JP | 2012-076547 A | 4/2012 |

\* cited by examiner

FIG.23
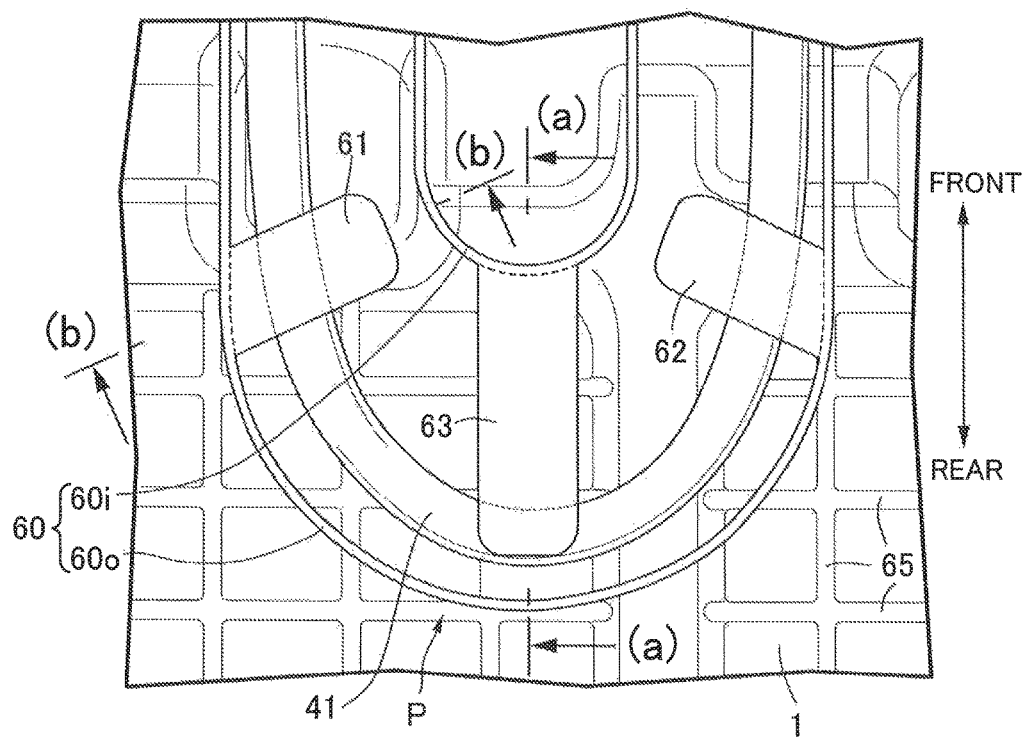
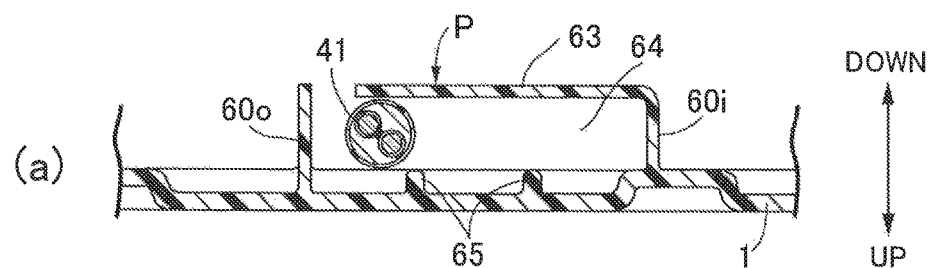
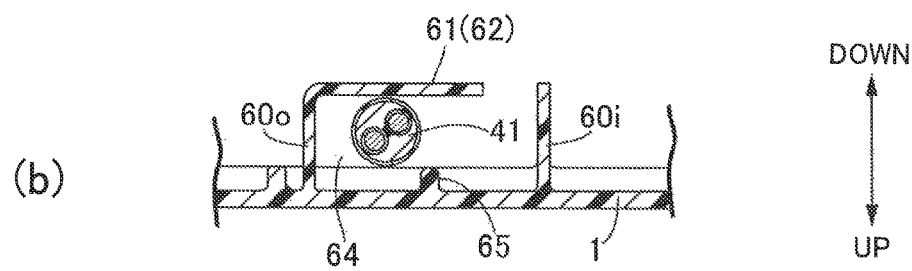

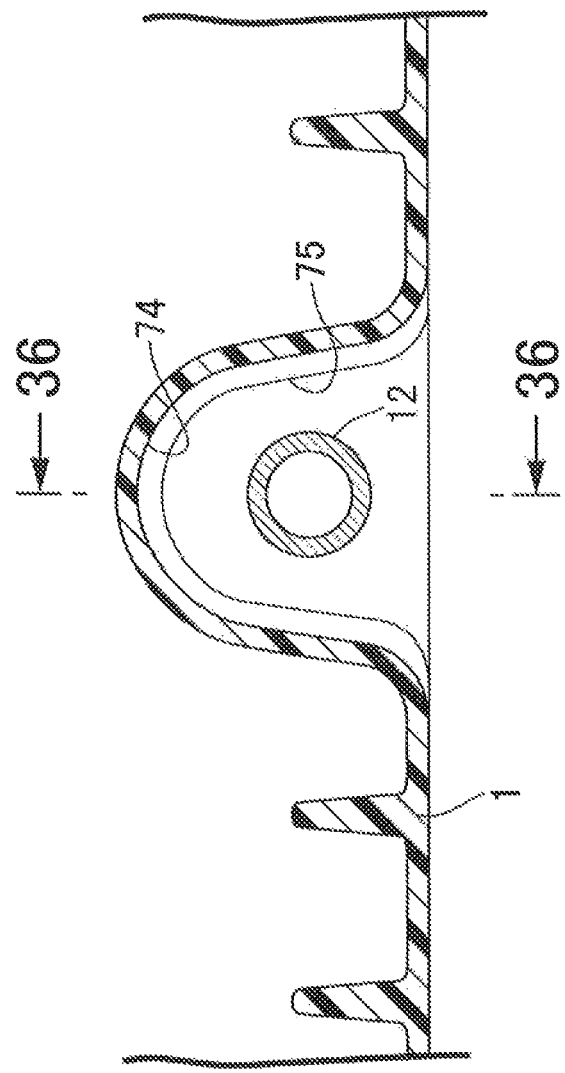

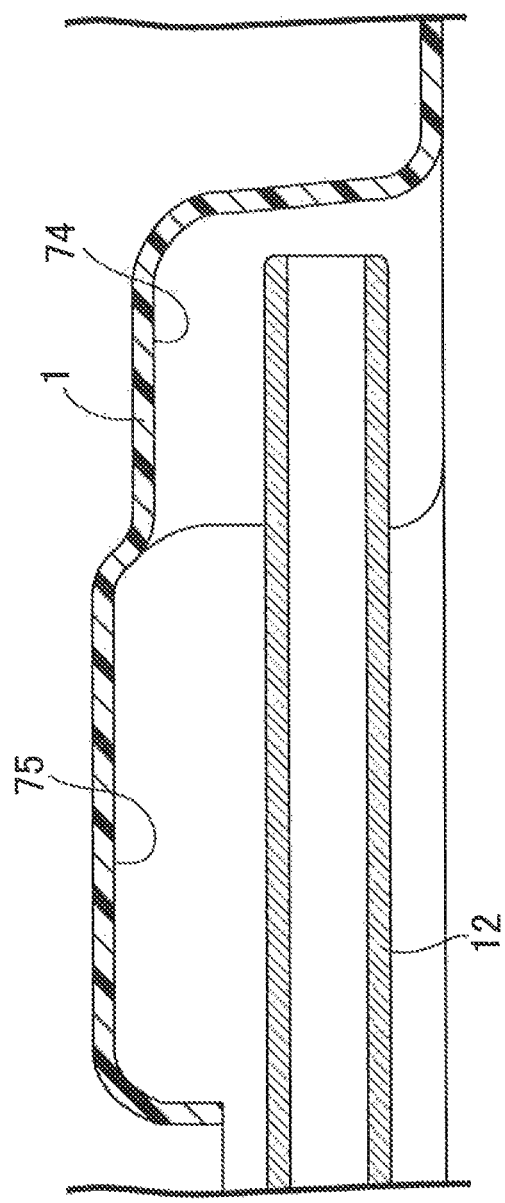

TWO-WHEELED MOTOR VEHICLE SEAT DEVICE

TECHNICAL FIELD

The present invention relates to a two-wheeled motor vehicle seat device that includes a movable backrest.

BACKGROUND ART

A conventional two-wheeled motor vehicle seat device is known in which, to the rear of a front seat for a driver a rear seat for another occupant is formed so as to be one step higher, a backrest for the driver to lean on is provided at the stepped border between the two seats, and the backrest can be adjusted by moving it in the fore-and-aft direction to thus change the seat position for the driver (see Patent Document 1 below).

RELATED ART DOCUMENTS

Patent Documents

Patent Document 1: Japanese Patent No. 3812295

SUMMARY OF THE INVENTION

Problems to be Solved by the Invention

It is desirable to incorporate a heater into such a movable backrest so that the backrest can be heated and the driver can be warmed up and enjoy a pleasant and comfortable ride on the two-wheeled motor vehicle when the temperature is low such as in winter, but in the arrangement of Patent Document 1 the backrest is not equipped with a heater. Furthermore, in a seat device equipped with such a movable backrest, since the backrest moves in the fore-and-aft direction on the seat main body, there is a possibility that a cushion material will become soaked with water such as rain water that has flowed into a gap between the seat main body and the backrest and then gone through between a skin material and a base material of the seat main body, but the arrangement of Patent Document 1 has the problem that there are no measures against such a possibility.

It is an object of the present invention to provide a novel two-wheeled motor vehicle seat device equipped with a movable backrest that has a heater incorporated into the movable backrest, in which the heater can be energized without giving rise to any problems even if the backrest moves, and a cushion material can be prevented from being soaked with water such as rain water that has flowed into a gap between a seat main body and the backrest and then gone through between a skin material and a base material of the seat main body.

Means for Solving the Problems

In order to attain the above object, according to a first aspect of the present invention, there is provided a two-wheeled motor vehicle seat device in which a backrest is provided on a seat main body mounted on a vehicle body so that the backrest can move in a fore-and-aft direction thereof, characterized in that a heater is incorporated into the backrest, and a harness connected to the heater is passed through an interior of the seat main body and connected to a power supply.

According to a second aspect of the present invention, in addition to the first aspect, accompanying the fore-and-aft movement of the backrest, the harness is arranged so as to move in the same direction, and the seat main body is provided with guiding and protecting means that guides movement of the harness and protects the harness.

According to a third aspect of the present invention, in addition to the first aspect, a harness guide tube is provided integrally with a backrest bottom of the backrest, the harness guide tube having the harness, connected to the heater, inserted therethrough and guiding the harness, and the harness guide tube passes through a seat bottom of the seat main body and extends within the seat main body.

According to a fourth aspect of the present invention, in addition to the third aspect, a harness retaining part that retains the harness is provided at a rear end of the harness guide tube.

According to a fifth aspect of the present invention, in addition to the third or fourth aspect, the harness guide tube is provided in a space of a mounting frame that guides movement in the fore-and-aft direction of the backrest with respect to the seat main body.

According to a sixth aspect of the present invention, in addition to the third, fourth or fifth aspect, the harness guide tube is received by a recess portion formed in a lock cover of a lock mechanism that locks the backrest to the seat main body.

According to a seventh aspect of the present invention, there is provided a two-wheeled motor vehicle seat device in which a backrest is movably provided on a seat main body mounted on a vehicle body, characterized in that an opening is provided in the seat main body, the opening so as to straddle a seat bottom and a skin material of the seat main body, a mounting frame linked to the backrest extending through the opening, and the backrest being capable of being moved relative to the seat main body by operation of the mounting frame, and a waterproof guide frame is provided on the seat main body, a guide part being provided on the waterproof guide frame, and the guide part extending within the opening while straddling a surface of the skin material and a reverse face of the seat bottom.

According to an eighth aspect of the present invention, in addition to the seventh aspect, a support face is formed on the waterproof guide frame, the support face opposing an outer face of the seat main body and supporting the skin material.

According to a ninth aspect of the present invention, in addition to the seventh or eighth aspect, the guide part of the waterproof guide frame is formed into a tubular shape.

According to a tenth aspect of the present invention, in addition to the eighth or ninth aspect, the guide part of the waterproof guide frame comprises a plurality thereof, and the guide parts are linked by the support face.

According to an eleventh aspect of the present invention, in addition to the eighth, ninth or tenth aspect, the guide part of the waterproof guide frame comprises two thereof, and the support face is formed so as to be wider than a gap between the two guide parts.

According to a twelfth aspect of the present invention, in addition to the seventh, eighth, ninth, tenth or eleventh aspect, an engagement portion is formed integrally with an end part, on the seat main body side, of the guide part provided in the opening, the engagement portion engaging with the reverse face of the seat bottom of the seat main body.

According to a thirteenth aspect of the present invention, in addition to the seventh, eighth, ninth, tenth, eleventh or twelfth aspect, an operating member is provided on a lock plate of a lock mechanism for the backrest further outside than the guide part, and an operating terminal of the operating member extends outward beyond a terminal of the seat main body.

Effects of the Invention

In accordance with the first aspect of the present invention, since the heater is incorporated into the backrest, and the harness connected to the heater is connected to the power supply through the interior of the seat main body, although the backrest is of a movable type, an operation of maneuvering the wiring of the harness becomes easy, and the harness can be shortened.

In accordance with the second aspect of the present invention, since accompanying the fore-and-aft movement of the backrest the harness is arranged so as to move in the same direction, and the seat main body is provided with guiding and protecting means that guides movement of the harness and protects the harness, it is possible to prevent interference between the harness and a vehicle body, thereby preventing problems such as failure of energization due to breakage of the harness.

In accordance with the third aspect of the present invention, because of the harness guide tube guiding the harness, it is possible to prevent the harness from interfering with or being caught by another object, the harness is not exposed between the backrest and the seat main body, and it is thus possible to improve the appearance and enhance the product value.

In accordance with the fourth aspect of the present invention, because of the harness retaining part at the rear end of the harness guide tube, it is possible to easily fix a part, extending from the harness guide tube, of the harness, and it is thus possible to prevent the harness from interfering with or being caught by another object.

In accordance with the fifth aspect of the present invention, since the harness guide tube is provided in a space of the mounting frame guiding the fore-and-aft movement of the backrest with respect to the seat main body, it is possible to dispose the harness by utilizing a dead space of the mounting frame and, moreover, it is possible to shorten the harness by placing it along the direction of movement of the backrest.

In accordance with the sixth aspect of the present invention, the harness guide tube can be disposed compactly within a confined space without interfering with the lock mechanism.

In accordance with the seventh aspect of the present invention, because of the guide part of the waterproof guide frame provided on the seat main body, it is possible to suppress as much as possible the entry of water such as rain water, which has entered via the opening having the mounting frame, connected to the backrest, extending therethrough, between the skin material and the seat bottom of the seat main body and soaking of the cushion material, and the water can be discharged to the reverse face side of the seat main body through the guide member.

In accordance with the eighth aspect of the present invention, since the skin material is supported by the support face of the waterproof guide frame, it is possible to suppress movement or lifting of the skin material and put the skin material and the seat bottom in intimate contact with each other, thus preventing a gap from occurring therebetween.

In accordance with the ninth aspect of the present invention, since the guide part of the waterproof guide frame is tubular, this guide part extends through the skin material and the seat bottom of the seat main body, the seepage of water through the gap therebetween is suppressed, and even when the seat main body experiences vibration from the vehicle body, water can be discharged by smoothly guiding it toward the reverse face of the seat bottom.

In accordance with the tenth aspect of the present invention, since the guide part of the waterproof guide frame is linked via the support face, it is possible to retain the skin material of the seat main body by the support face linked to the guide member, and the skin material can be supported stably over a wide range.

In accordance with the eleventh aspect of the present invention, since the support face of the waterproof guide frame is formed so as to be wider than the gap between the two guide parts, it is possible to support the skin material stably over a still wider range.

In accordance with the twelfth aspect of the present invention, since the engagement portion engaging with the reverse face of the seat bottom of the seat main body is formed integrally with an end part, on the seat main body, of the guide part, it is possible to fix the guide part to the seat main body without employing another fixing means such as a screw.

In accordance with the thirteenth aspect of the present invention, since the operating member of the lock plate of the lock mechanism for the backrest is provided further outside than the guide part, and the operating terminal of the operating member extends outward beyond the terminal of the seat main body, it is possible to release the lock of the lock mechanism by pulling the operating member without lifting up the seat main body.

BRIEF DESCRIPTION OF DRAWINGS

FIG. 23 is a bottom view of harness guiding and protecting means (when harness most backward) (another embodiment).

FIG. 35 is an enlarged sectional view along line 35-35 in FIG. 18.

FIG. 36 is a sectional view along line 36-36 in FIG. 35.

EXPLANATION OF REFERENCE NUMERALS AND SYMBOLS

Figure 1:
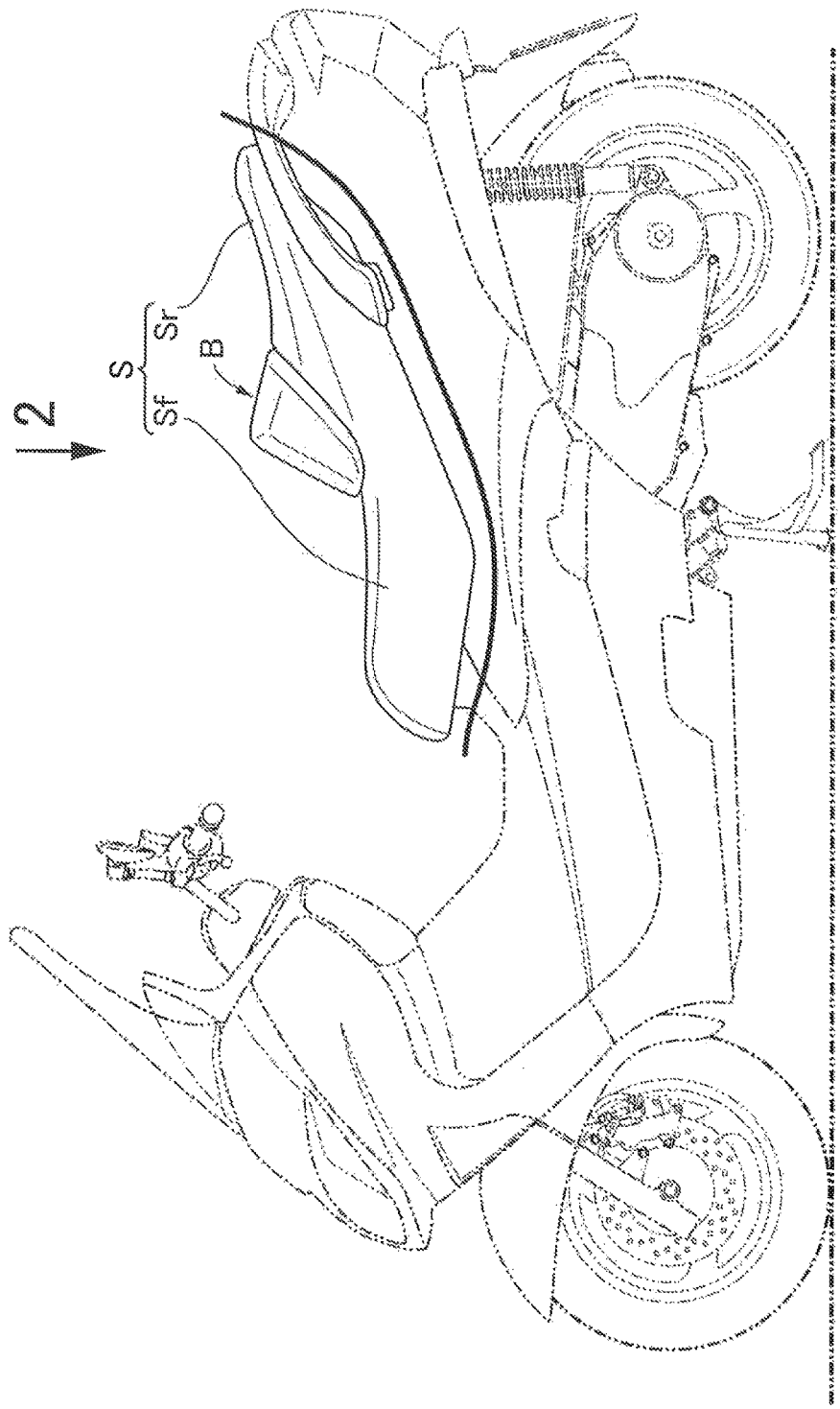
FIG. 1 is a side view of a scooter type two-wheeled motor vehicle equipped with a seat device related to the present invention.
Figure 2:
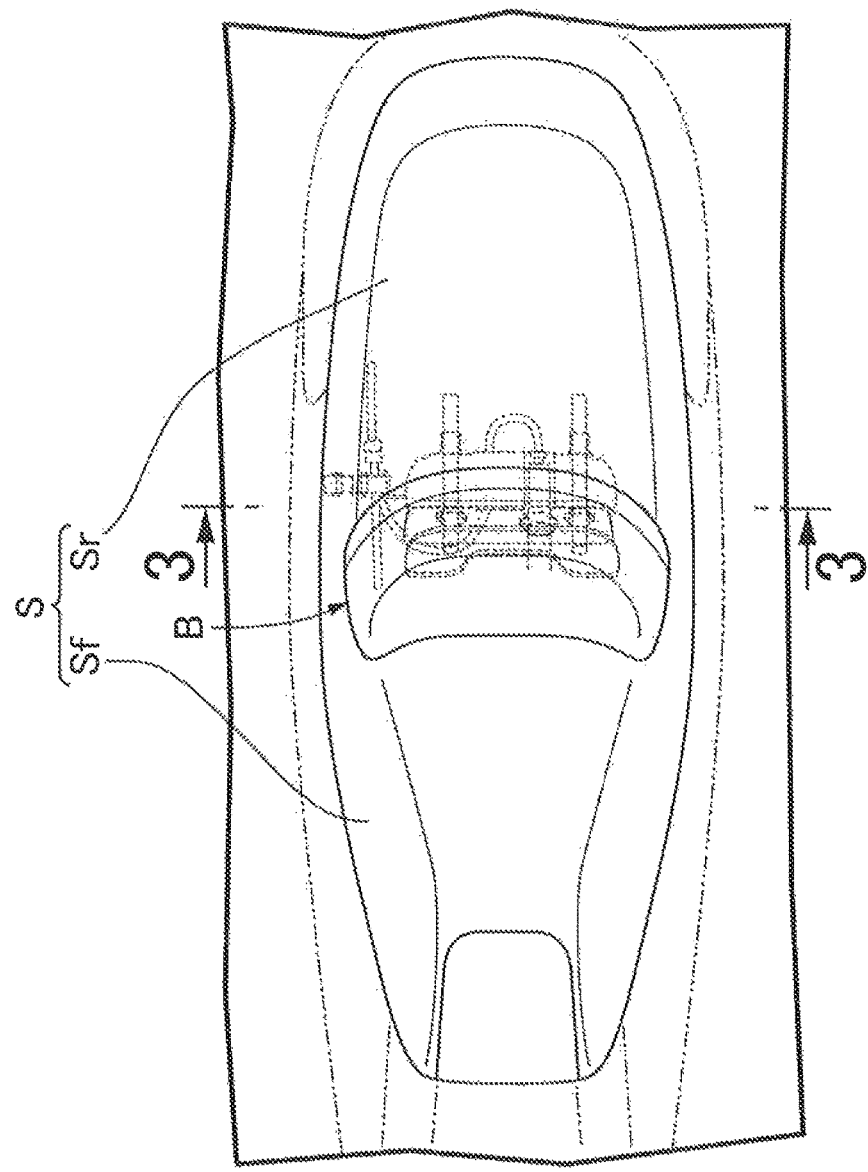
FIG. 2 is a view in the direction of arrow 2 in FIG. 1.

1 Seat bottom (seat base material)
1a Opening
3 Skin material
12 Mounting frame (pipe frame)
15 Guide part
15a Engagement portion (claw piece)
15b Engagement portion (slit)
17 Support face
20 Lock bracket
21 Lock plate
22 Lock cover
22a Recess portion
24 Guide tube
30 Operating member (strap)
30a Operating terminal
33 Operating space
41 Harness
42 Harness guide tube
43 Harness retaining part
B Backrest
C Cowling
G Waterproof guide member
H Heater
P Harness guiding and protecting means
R Lock device
S Seat main body

MODES FOR CARRYING OUT THE INVENTION

An embodiment in which the seat device of the present invention is implemented in a scooter type two-wheeled motor vehicle is explained.

In the explanation below, the front and rear of a scooter type two-wheeled motor vehicle on which the seat is placed are defined as 'fore-and-aft', the left and right thereof are defined as 'lateral', and the top and bottom thereof are defined as 'vertical'.

An embodiment of the present invention is now explained by reference to FIGS. 1 to 15.

As shown in FIG. 1, a tandem type seat main body S is mounted on a vehicle body rear part of a scooter type two-wheeled motor vehicle. The seat main body S includes a front seat Sf for a driver to sit on and a rear seat Sr for another occupant to sit on, the rear seat Sr being formed one step higher than the front seat Sf, and a backrest B for the driver to lean on being provided in a recess part of the step between the front seat Sf and the rear seat Sr. The backrest B is formed so as to be movable with respect to the seat main body S, that is, movement in the fore-and-aft direction thereof being adjustable manually. A heater H for heating the backrest B is installed.

Figure 4:
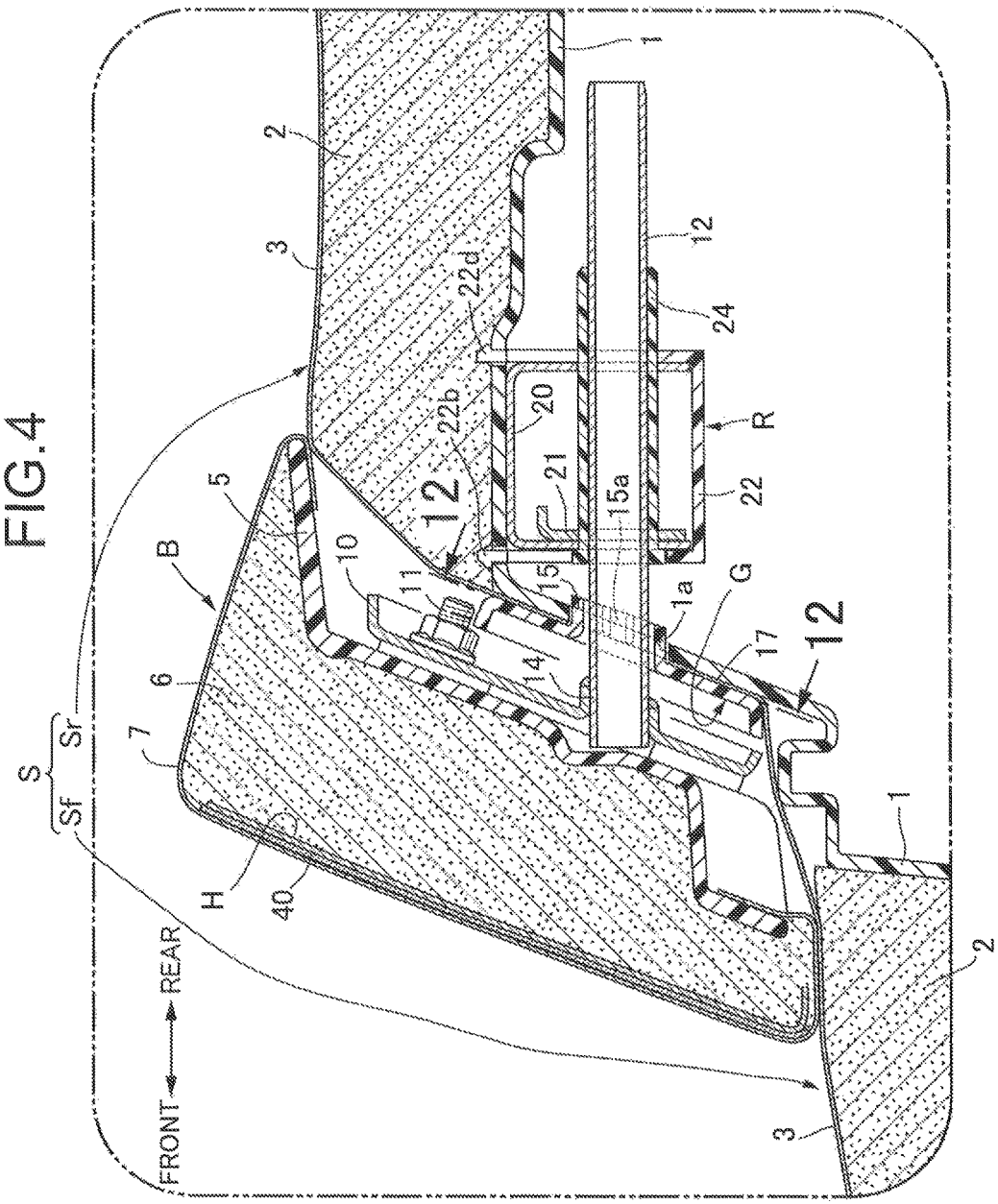
FIG. 4 is an enlarged sectional view along line 4-4 in FIG. 3.
Figure 5:
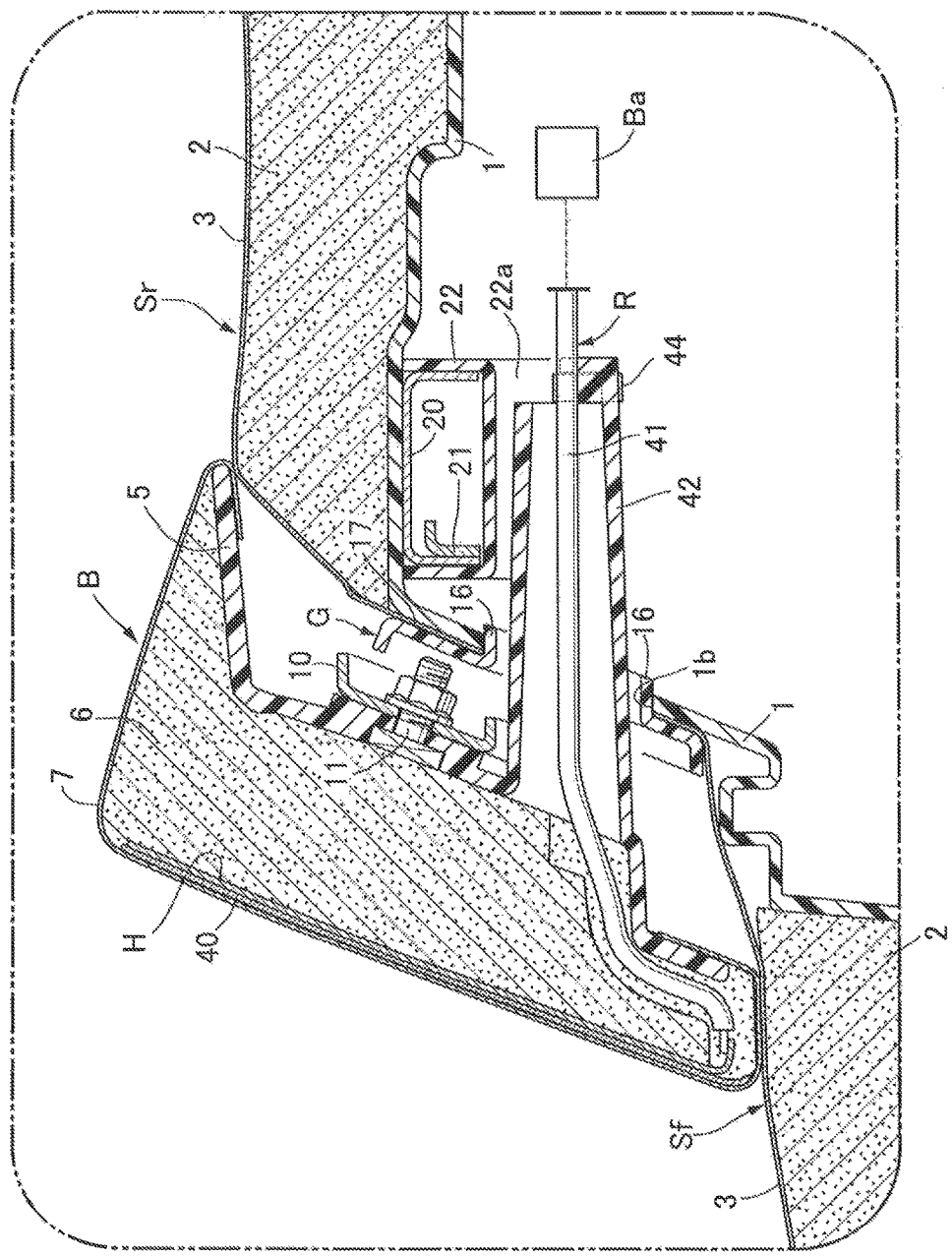
FIG. 5 is an enlarged sectional view along line 5-5 in FIG. 3.
Figure 6:
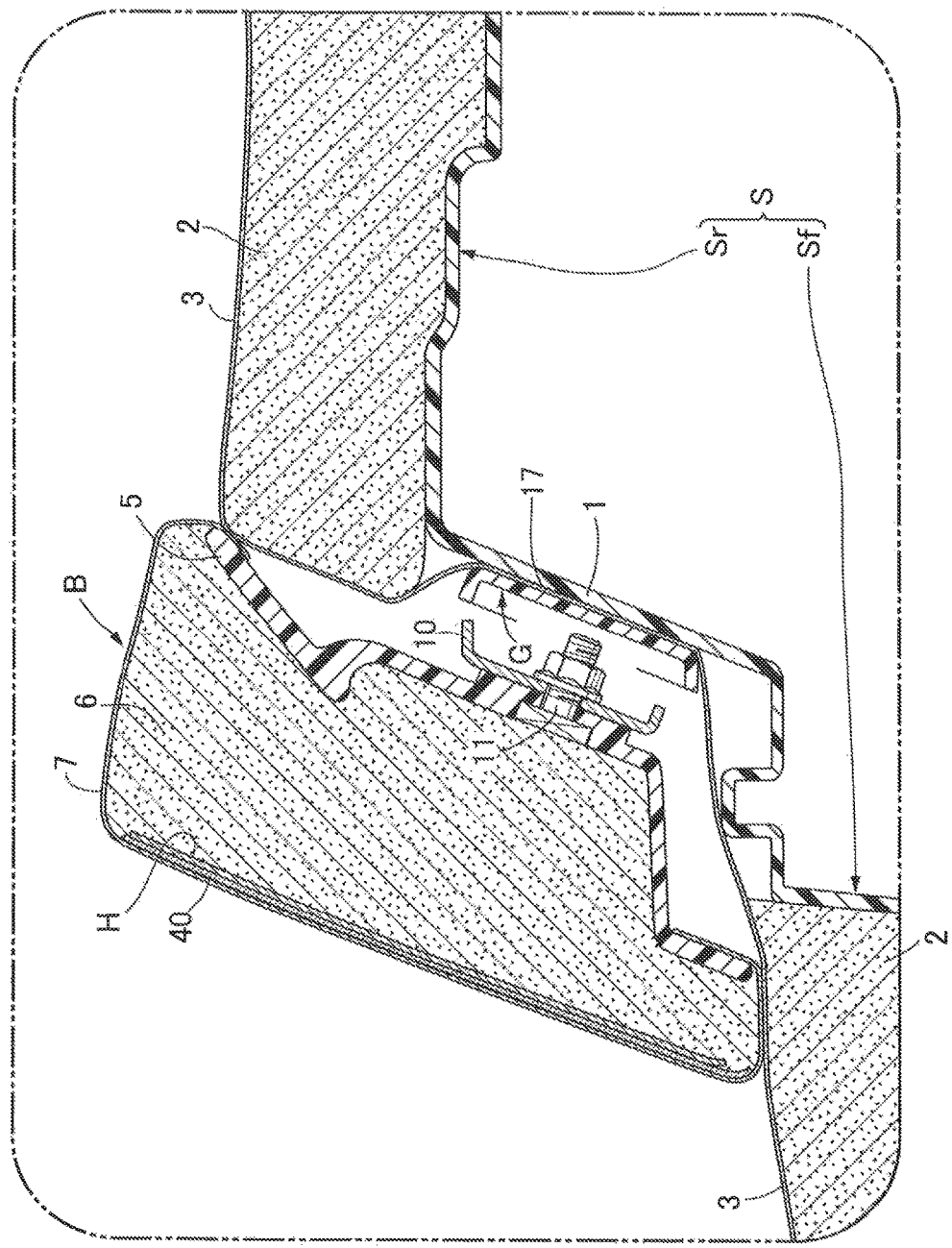
FIG. 6 is an enlarged sectional view along line 6-6 in FIG. 3.

As shown in FIGS. 4 to 6, the tandem type seat main body S formed from the front seat Sf and the rear seat Sr is as usual formed by disposing a cushion material 2 on top of a hard seat bottom (base material) 1 and covering an outer side of the cushion material 2 with a skin material 3, the skin material 3 being fixed to the seat bottom 1.

The backrest B is formed by disposing a cushion material 6 on a backrest bottom 5 opposing a step part of the seat bottom 1 and covering an outer side of the cushion material 6 with a skin material 7, the skin material 7 being fixed to the backrest bottom 5.

The backrest B is formed into a pillow shape having a concave front face in order to wrap around the lower back of the driver, a lower face of the backrest B is seated on a rear upper face of the front seat Sf so that it can move in the fore-and-aft direction, and an upper face thereof is continuous with a front upper face of the rear seat Sr.

As shown in FIGS. 4 to 6 and FIG. 11, a plate-shaped support frame 10 that is long in the lateral direction is fixed to a back face of the backrest bottom 5 of the backrest B by a plurality of bolts and nuts 11. Front ends of two pipe frames 12 and 12 as a mounting frame for the backrest B are welded by a weld 14 to left and right parts of the support frame 10. The two pipe frames 12 and 12 are parallel to each other, extend through openings 1a and 1a opened in the seat bottom 1 and the skin material 3 of the seat main body S, and extend through and are supported on a lock mechanism R, which is described later, so that they can move in the fore-and-aft direction. As described later, the backrest B is fixed by a locking operation of the lock mechanism R and its movement in the fore-and-aft direction can be adjusted manually by releasing the lock.

As shown in FIGS. 4 to 6, a waterproof guide frame G is provided on a front face of the rear seat Sr opposing a back face of the backrest B. The waterproof guide frame G is superimposed on the front face of the rear seat Sr with the skin material 3 of the seat main body S sandwiched therebetween, thus supporting the skin material 3.

Figure 12:
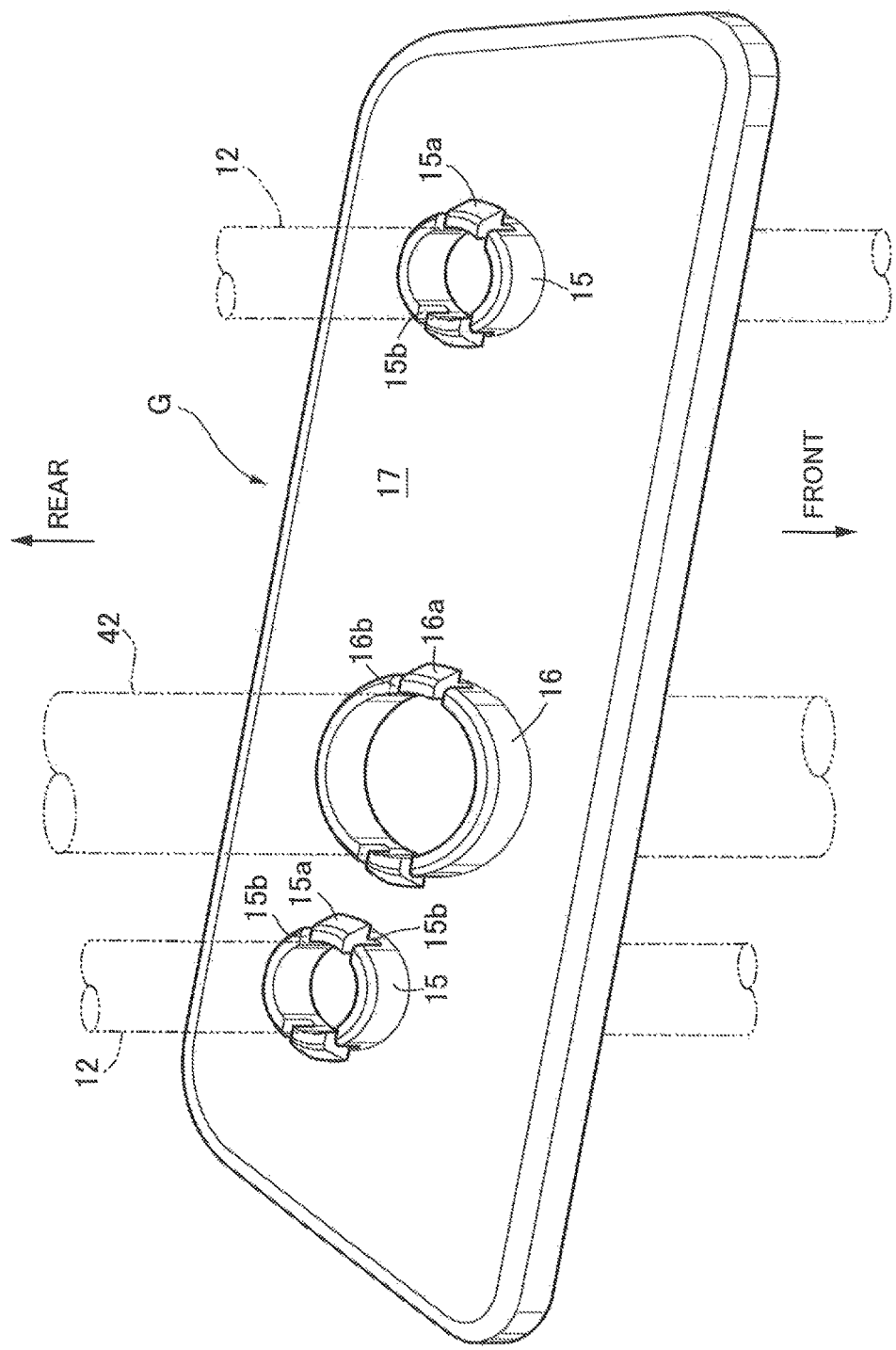
FIG. 12 is an enlarged perspective view of a waterproof guide frame along line 12-12 in FIG. 4.

As shown in FIG. 12, the waterproof guide frame G is formed into a rectangular shape that is long in the lateral direction, and short cylindrical guide parts 15 and 15 are symmetrically formed integrally with left and right end parts of a rear face (a face opposing the rear seat Sr), the pair of left and right pipe frames 12 and 12 extending through the guide parts 15 and 15. These guide parts 15 and 15 project toward the seat bottom 1 side, and a claw piece 15a and slits 15b on opposite sides of the claw piece 15a are formed on each of the left and right parts of the guide part. As shown in FIG. 4, the pair of guide parts 15 and 15 are inserted into the openings 1a and 1a opened in the seat bottom 1 and the skin material 3 and extend so as to straddle the skin material 3 and the seat bottom 1 of the seat main body S, the left and right claw pieces 15a engaging with the peripheral edge of the opening 1a and thereby fixing the guide parts 15 and 15 in the openings 1a and 1a of the seat bottom 1.

As shown in FIGS. 5 and 12, one short cylindrical harness guide part 16 opens in the waterproof guide frame G between the pair of guide parts 15 and 15 at a position beneath the guide parts 15 and 15. The harness guide part 16 is formed so as to guide a harness guide tube 42, which is described later, and in the same way as for the guide part 15 a claw piece 16a and slits 16b on opposite sides of the claw piece 16a are formed on each of the left and right parts of the harness guide part 16. The harness guide part 16 is inserted into an opening 1b opened in the seat bottom 1 and extends so as to straddle the skin material 3 and the seat bottom 1 of the seat main body S, and the left and right claw pieces 16a engage with the peripheral edge of the opening 1b, thereby fixing the harness guide part 16 in the opening 1b (see FIG. 7).

The pair of guide parts 15 and 15 and the harness guide part 16 of the waterproof guide frame G can stop water such as rain water, which has flowed into the backrest B and the seat main body S, from infiltrating into a gap between the skin material 3 and the seat bottom 1 and soaking the cushion material 2.

The waterproof guide frame G, which is formed into a rectangular shape, has a wide flat support face 17 surrounding the guide parts 15 and 15 and the harness guide part 16; the support face 17 supports the skin material 3 of the seat main body S and prevents it from lifting, and no gap is formed between itself and the seat bottom 1.

The structure of the lock mechanism R for locking the position to which the backrest B is adjusted at a plurality of stages in the fore-and-aft direction with respect to the seat main body S is now explained by reference to FIGS. 4 to 7 and 13 to 15.

The lock mechanism R is integrally suspended and supported by the lower face of the seat bottom 1, and includes a lock bracket 20, a lock plate 21 provided so that it can slide in the lateral direction within the lock bracket 20, and a lock cover 22 covering the lock bracket 20. The lock bracket 20 is formed so as to have a gate-shaped cross section and extends in the lateral direction in a lower part of the seat bottom, and guide tubes 24 and 24 are inserted and fixed into insertion holes 20a and 20b opened in front and rear walls of the left and right parts of the lock bracket 20.

Figure 14:
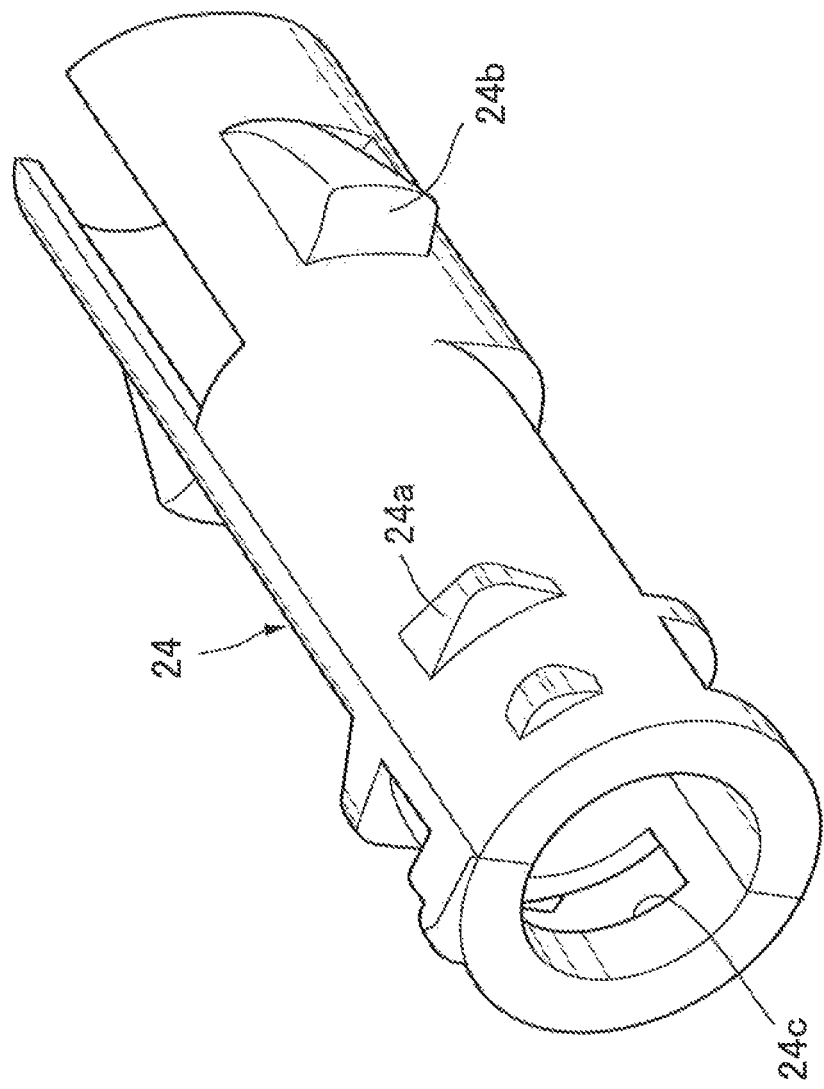
FIG. 14 is an enlarged view in the direction of arrow 14 in FIG. 13.

As shown in FIG. 14, each guide tube 24 is made of a synthetic resin, is formed in halves along the axial direction so that molding is easy, and engagement pieces 24a and 24b engaging with the insertion holes 20a and 20b respectively are projectingly provided integrally with an outer peripheral face of each guide tube 24. The two pipe frames 12 and 12, which are linked to the backrest B, extend slidably through the interior of the pair of guide tubes 24 and 24.

Figure 7:
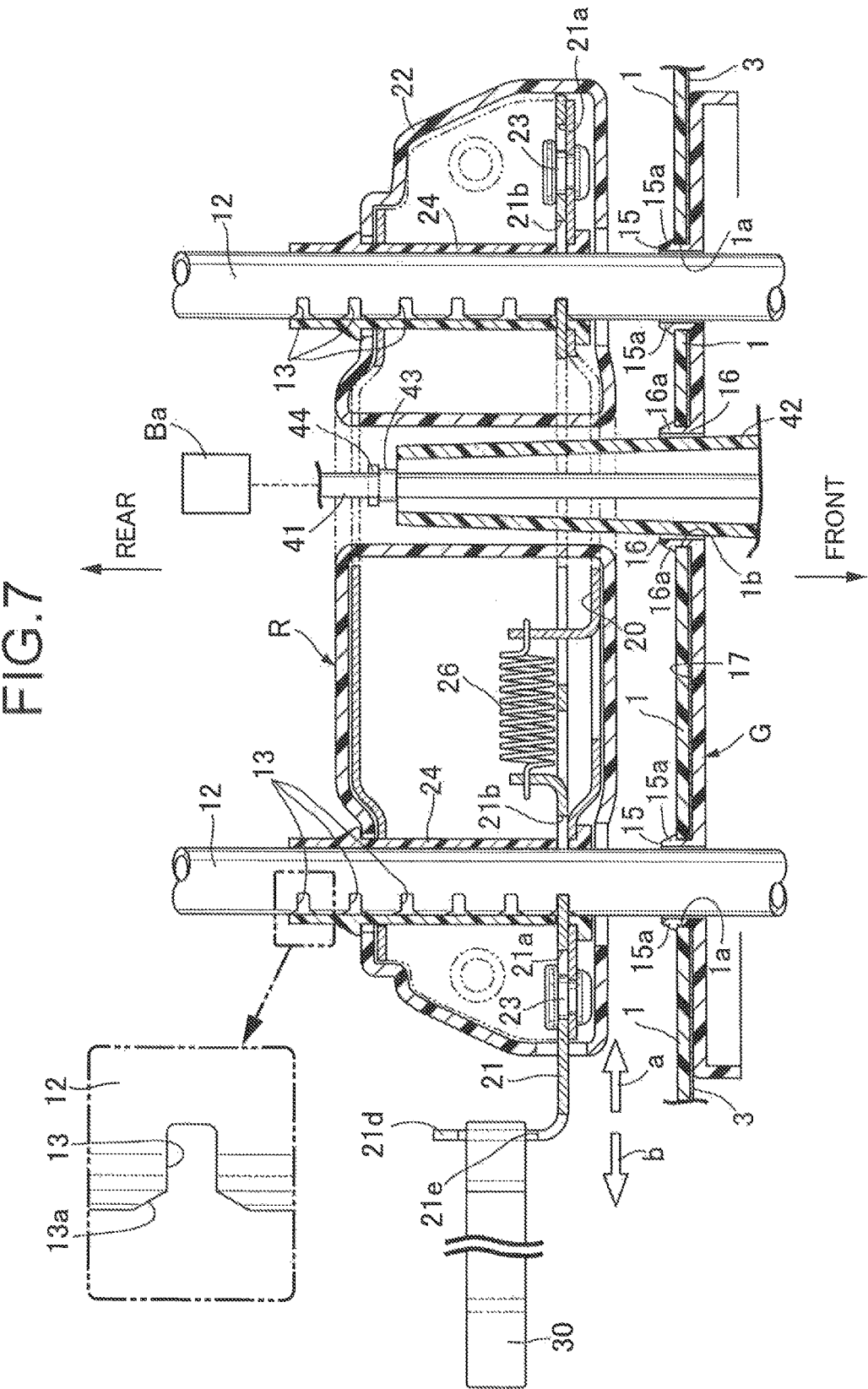
FIG. 7 is a sectional view along line 7-7 along line in FIG. 3.

As shown in FIG. 7, a plurality (six) of arc-shaped fitting slits 13 are formed in an outside face of an intermediate portion of each pipe frame 12 at intervals in the axial direction. Each of the fitting slits 13 is formed into a squared U shape, and opposite corner parts thereof are formed as chamfers 13a. A through hole 24c that selectively coincides with one of the plurality of fitting slits 13 opens on the outer periphery of a front part of each guide tube 24 (see FIG. 14).

The lock plate 21, which is provided in the lock bracket 20 so that it can slide in the lateral direction, is formed into a plate shape, and elongated holes 21a opening in opposite end parts thereof are pin-linked to opposite end parts of the lock bracket 20 by means of a link pin 23. The lock plate 21 can slide in the lateral direction with respect to the lock bracket 20 over the length range of the elongated hole 21a. Fitting holes 21b and 21b open in left and right parts of the lock plate 21, the fitting holes 21b and 21b being capable of being fitted selectively to one of the plurality of fitting slits 13 of the pipe frames 12 and 12 through the through hole 24c of the guide tube 24.

Figure 15:
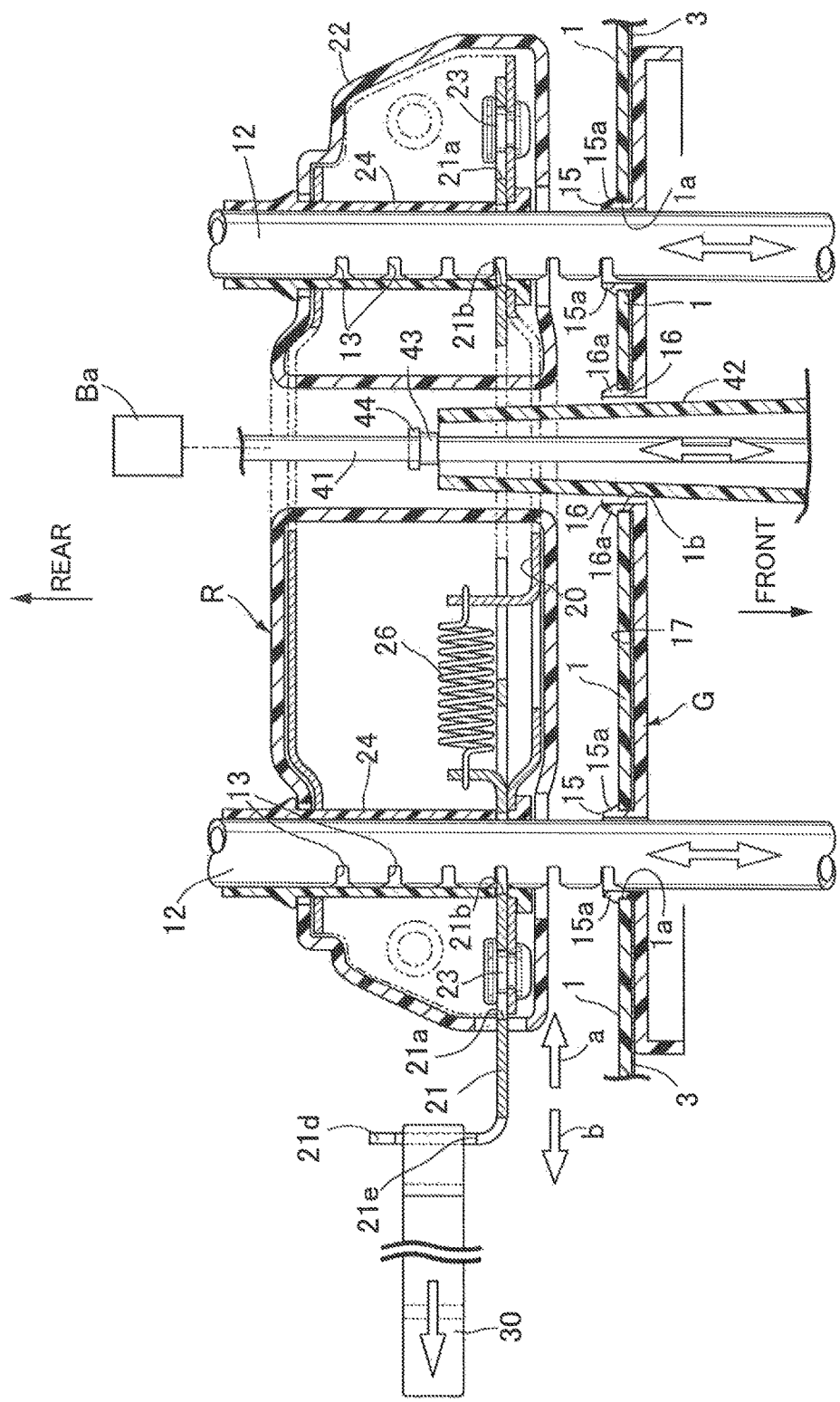
FIG. 15 is a sectional view, corresponding to FIG. 7, when the lock of a lock device is released.

As shown in FIGS. 7 and 15, a lock spring 26, which is a coil spring, is stretched between the lock plate 21 and the lock bracket 20; the lock spring 26 urges the lock plate 21 in the locking direction (direction of arrow a in FIGS. 7 and 15), and the fitting hole 21b is fitted selectively to one of the plurality of fitting slits 13 through the through hole 24c, thus locking the two pipe frames 12 and 12, that is, the backrest B.

Figure 3:
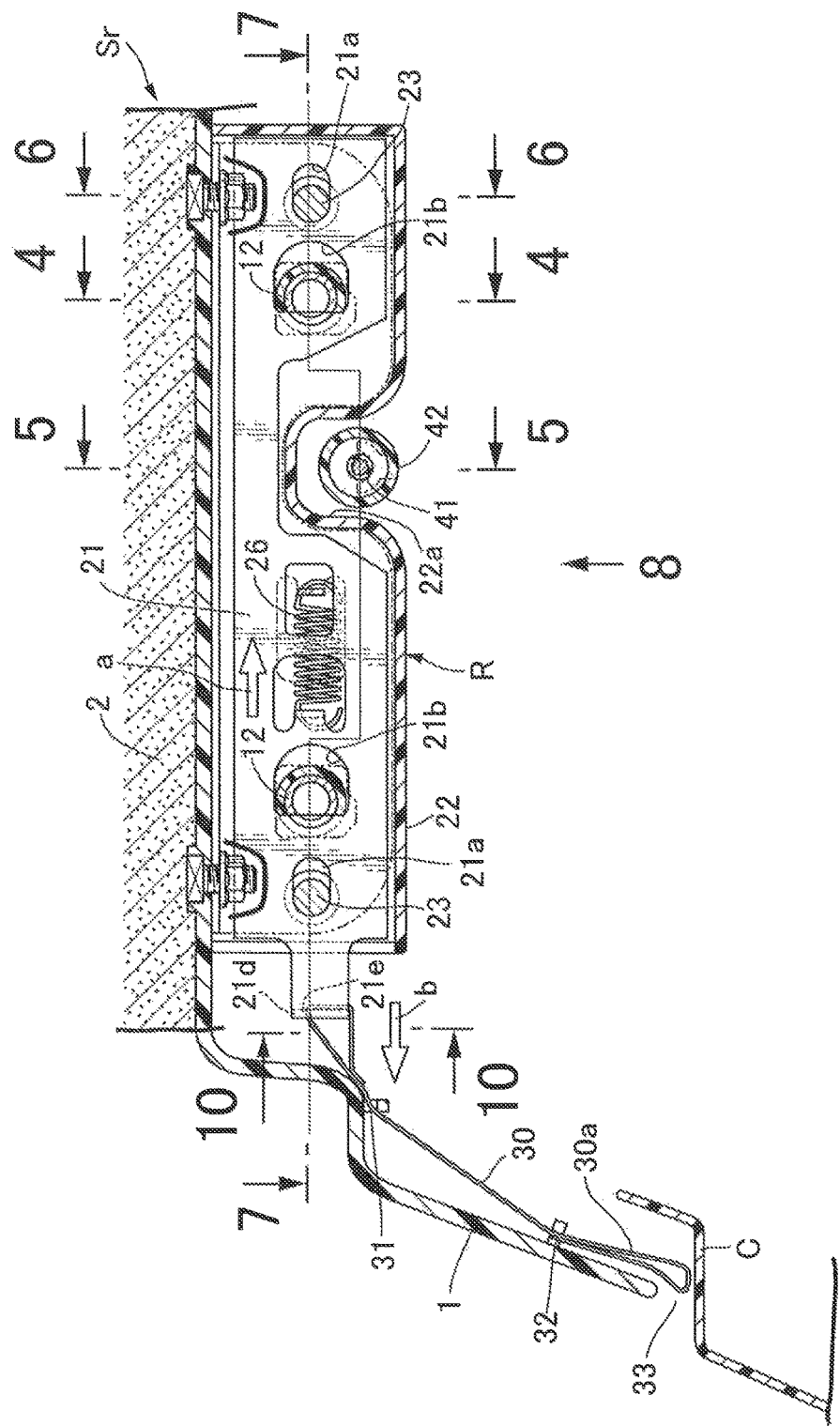
FIG. 3 is an enlarged sectional view along line 3-3 in FIG. 2.

As shown in FIGS. 3, 7, and 15, one end of a strap 30, which is a flexible band, as an operating member that can pull the lock plate 21 in the lock release direction (direction of arrow b) is joined to a lock lever 21d provided at one end (left end) of the lock plate 21. The strap 30 extends outward along an inner face of a side part of the seat bottom 1 due to being guided by a retaining piece 31 and a guide piece 32 provided on the inner face of the side part of the seat bottom 1, and a loop-shaped operating terminal 30a faces an operating space 33 formed between the terminal of the seat main body S and a cowling C covering the vehicle body of the two-wheeled motor vehicle.

Figure 10:
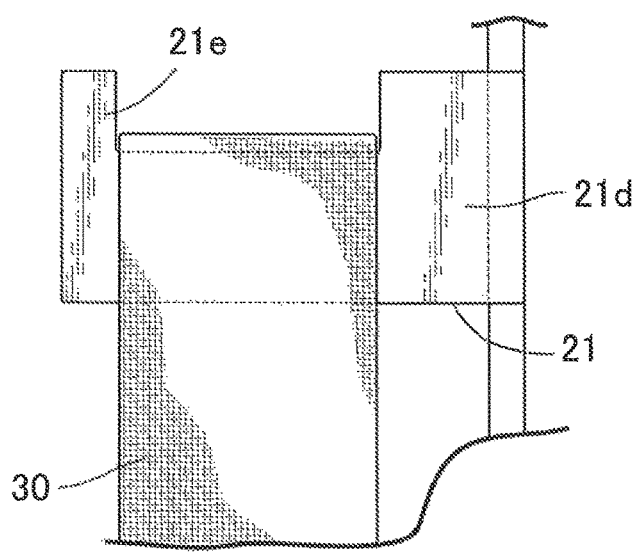
FIG. 10 is an enlarged partial view along line 10-10 in FIG. 3.
Figure 11:
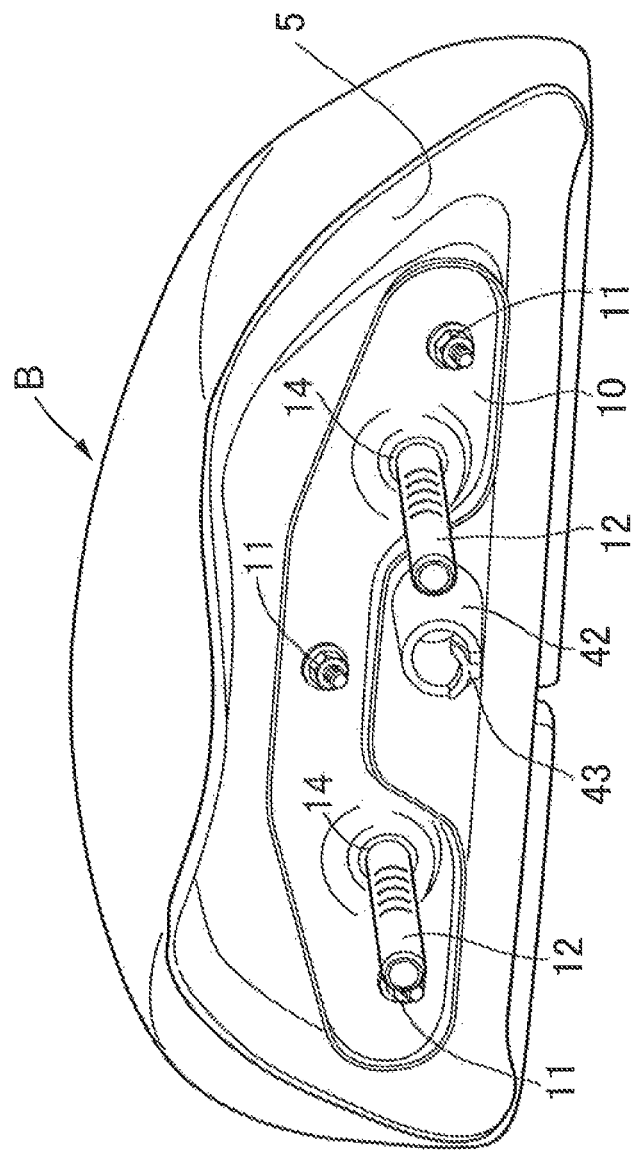
FIG. 11 is a perspective view of a back face of a backrest.

As shown in FIG. 10, a recess portion 21e is formed in the lock lever 21d, and the strap 30 is housed in the recess portion 21e, thus preventing displacement of the strap 30.

The operating member 30 may be a wire or a string.

When an operator pulls the strap 30 outward through the operating space 33, the lock plate 21 moves in the lock release direction (direction b in FIG. 15) against the urging force of the lock spring 26 as shown in FIG. 15, the fitting hole 21b becomes detached from the fitting slit 13 of the pipe frame 12, and movement of the backrest B in the fore-and-aft direction becomes adjustable. When the pulling force acting on the strap 30 is released, the lock plate 21 is moved in the locking direction (direction a in FIG. 7) as shown in FIG. 7 by the urging force of the lock spring 26 and returns to the lock position, thus fixing the backrest B.

Figure 13:
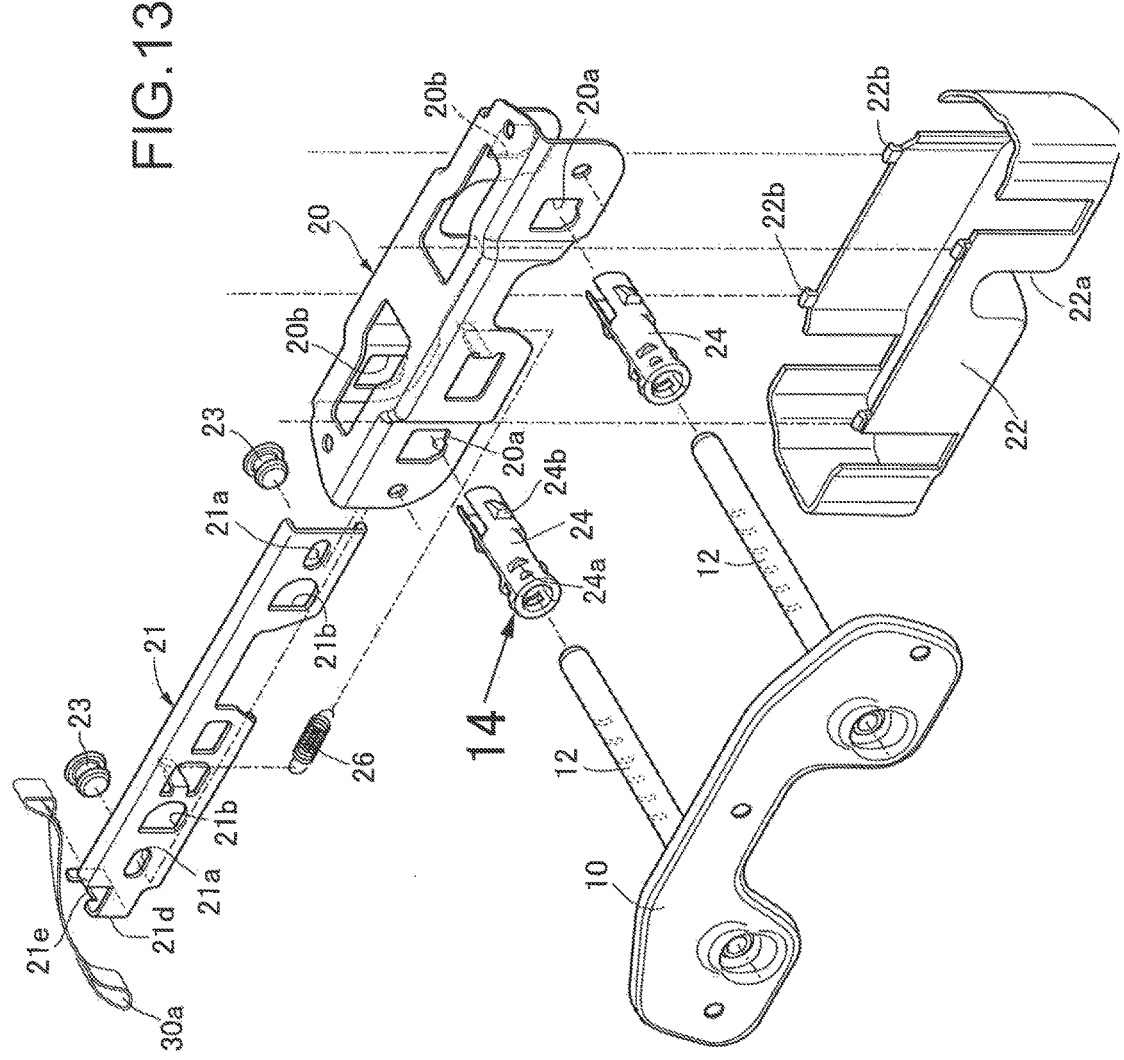
FIG. 13 is an exploded perspective view of a lock mechanism for the backrest.

As shown in FIG. 13, the lock cover 22 is formed so as to have a concave cross section and covers the lock bracket 20 from the lower side, a plurality of latching pieces 22b are projectingly provided on the upper edge of the lock cover 22, and the latching pieces 22b are latched onto the seat bottom 1, thus suspendedly supporting the lock mechanism R on the seat bottom 1 (see FIG. 4).

Figure 17:
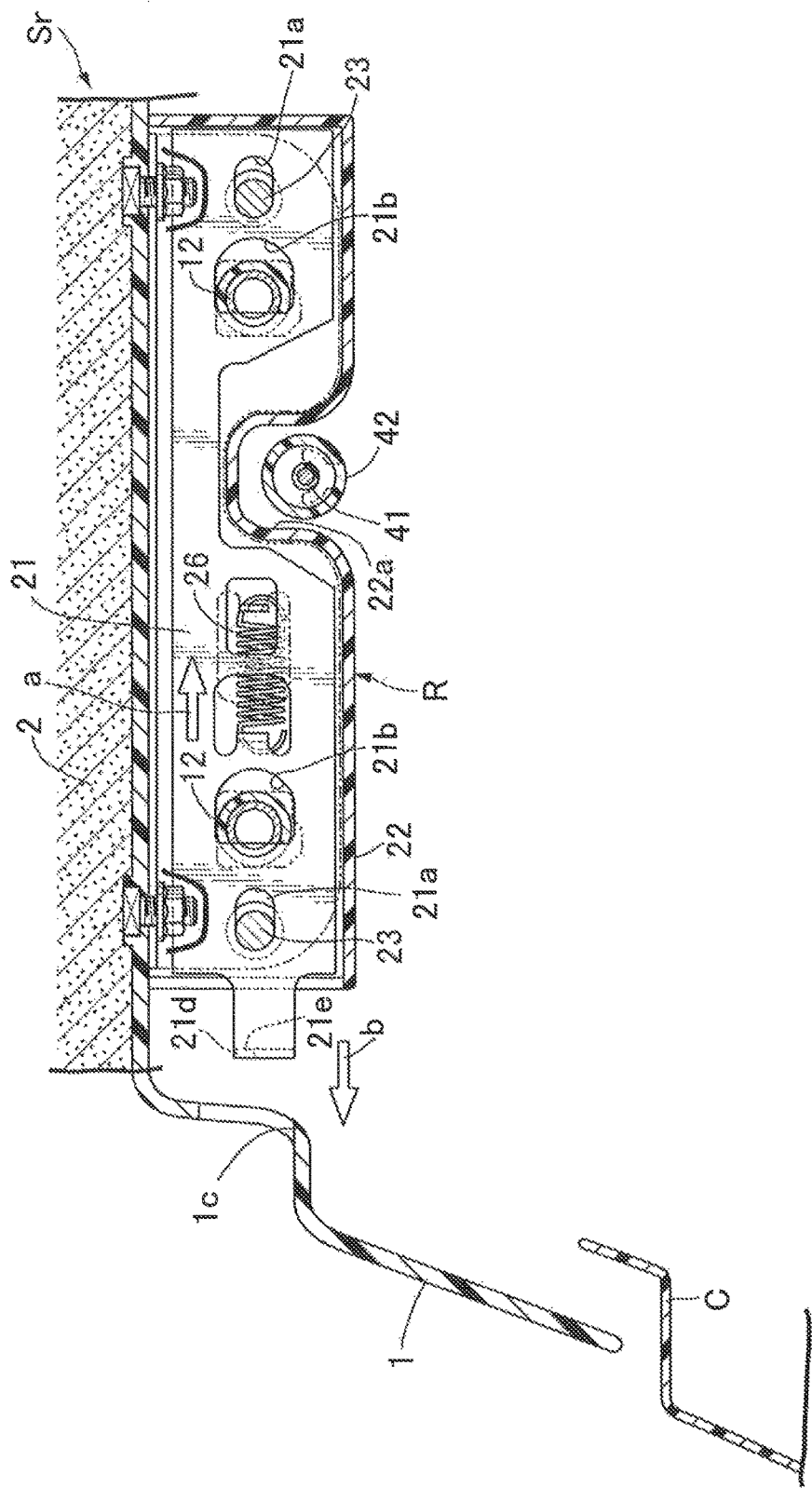
FIG. 17 is a sectional view, corresponding to FIG. 3, showing a modified example of the present invention.

FIG. 17 shows a modified example of operation means for pulling the lock plate 21 in the lock release direction. In accordance with this modified example, an operation port 1c opens in the seat bottom 1 so as to oppose one end (left end) of the lock lever 21d of the lock plate 21. An operator pulls the lock lever 21d through the operation port 1c, thereby enabling the lock plate 21 to move in the lock release direction.

The heater H is incorporated into the backrest B in order to heat it.

As shown in FIGS. 4 to 6, the plate-shaped heater H is incorporated between the back face of a front part of the skin material 7 of the backrest B and a front face of the cushion material 6 with a soft slab material 40 sandwiched therebetween. The heater H is operated with power from a two-wheeled motor vehicle power supply Ba, and one end of a harness 41 connected to the power supply Ba is connected to a lower part of the heater H.

Figure 8:
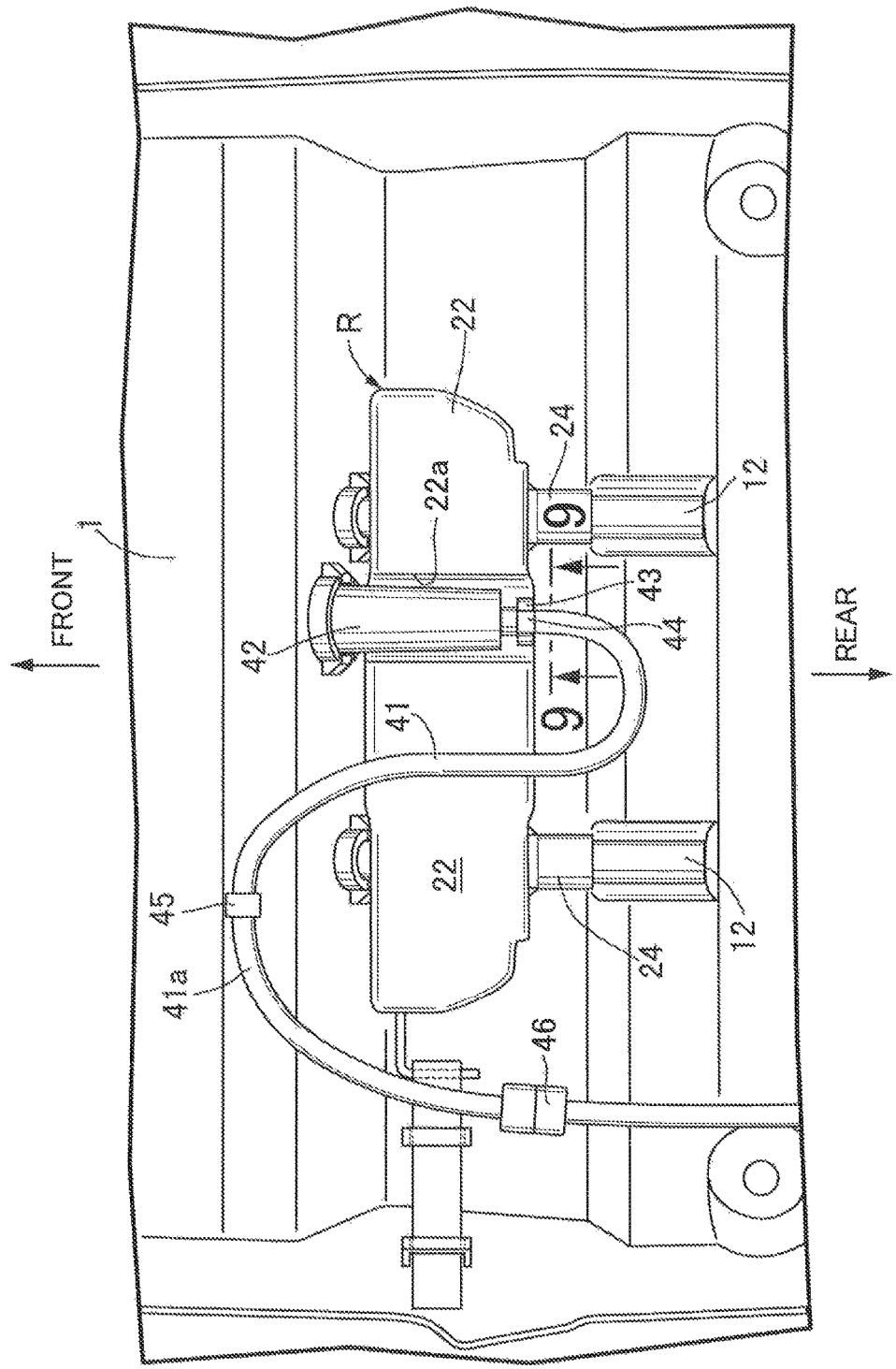
FIG. 8 is a view in the direction of arrow 8 in FIG. 3.
Figure 9:
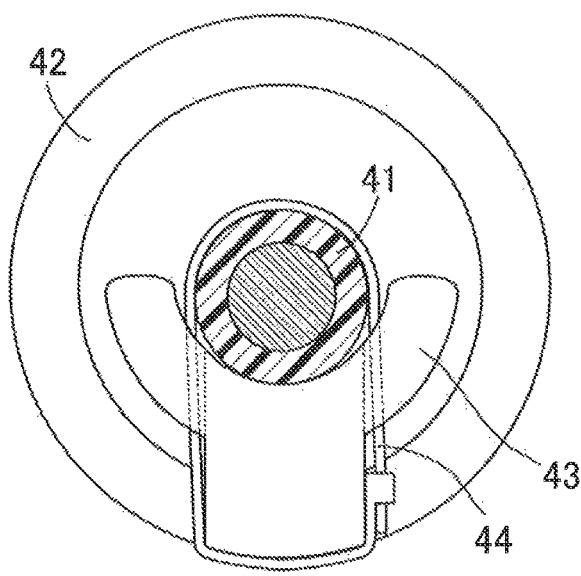
FIG. 9 is an enlarged sectional view along line 9-9 in FIG. 8.

As shown in FIG. 5, the harness guide tube 42 is provided integrally with a laterally intermediate part of a lower part of the backrest bottom 5, the harness 41 being inserted through the harness guide tube 42. The harness guide tube 42 is formed into a cylindrical shape that narrows in going to the rear, extends through the harness guide part 16 of the waterproof guide frame G, and extends to the rear of the backrest bottom 5. The harness guide tube 42 is received within a recess portion 22a formed in a lower face of the lock cover 22 of the lock mechanism R (see FIG. 8). As shown in FIG. 9, a Y-shaped harness retaining part 43 is formed integrally with a lower part in a rear end part (free end part) of the harness guide tube 42. The harness 41 extending out from the harness guide tube 42 is fixedly bound and retained on the harness retaining part 43 by means of a fastener 44 such as a tie wrap. The harness 41 extending out from the rear end of the harness guide tube 42 is curved into an S shape in the lateral direction as shown in FIG. 8, and its curved front end portion 41a is fixedly bound to a lower face of the seat bottom 1 by means of an appropriate fastener 45. The harness 41 extends from the curved front end portion 41a to the rear of the seat bottom 1 and is connected to the power supply Ba via a joint 46.

The harness 41 thus disposed has a stable shape from the rear end of the harness guide tube 42 to the fastener 45, and even when the backrest B moves it is possible to suppress a load acting on the harness.

Figure 16:
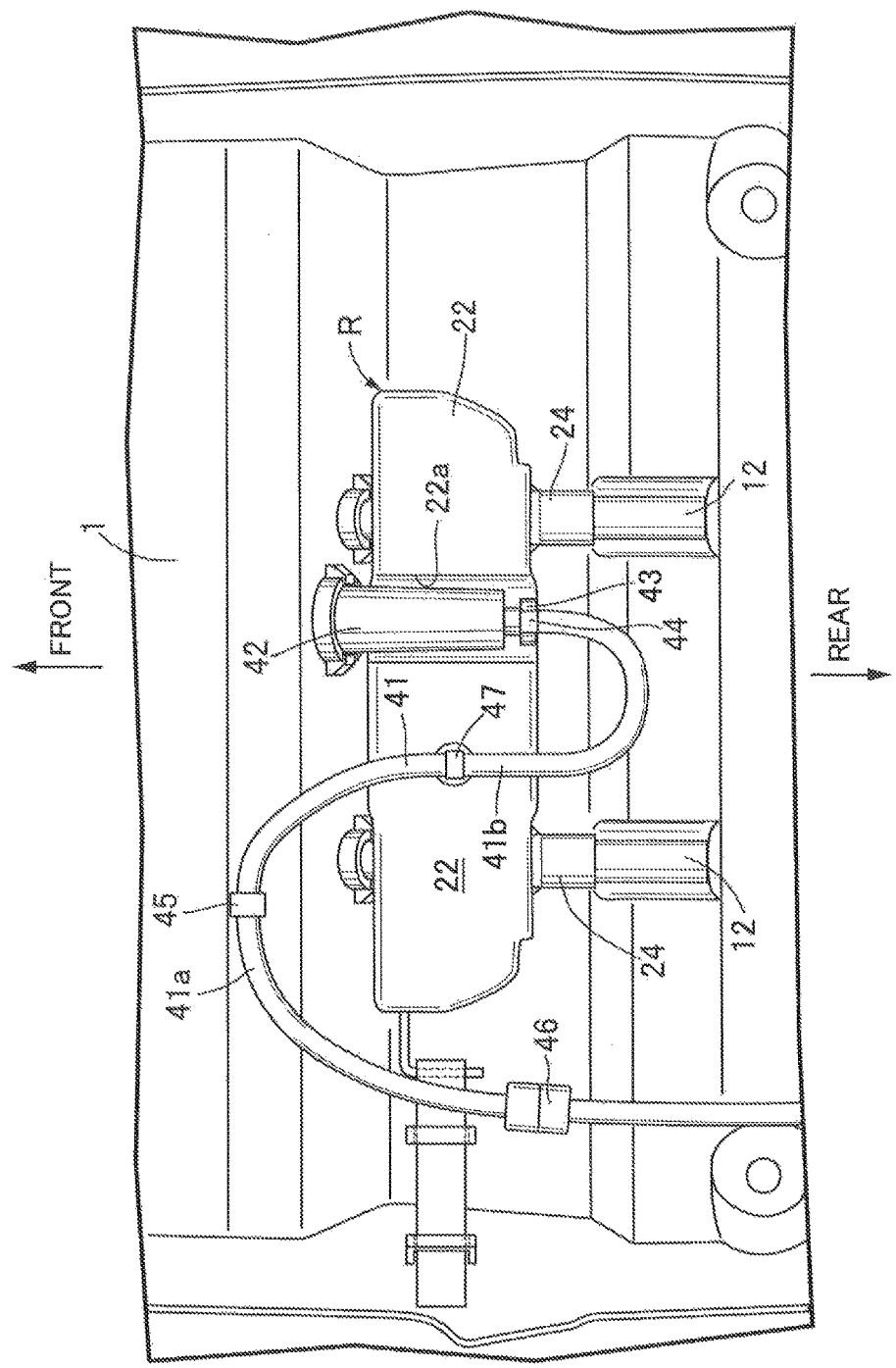
FIG. 16 is a sectional view, corresponding to FIG. 8, showing a modified example of the present invention.

FIG. 16 shows a modified example of fixing means for the harness 41 extending from the harness guide tube 42.

In accordance with this modified example, the harness 41 extending from the harness guide tube 42 is curved into an S shape in the lateral direction from the harness guide tube 42, a linear intermediate portion 41b is fixedly bound to a lower face of the lock cover 22 of the lock mechanism R by means of another fastener 47, and the curved front end portion 41a extending forward from the intermediate portion 41b is fixedly bound to a lower face of the seat bottom 1 by means of the fastener 45.

In this modified example also, the shape of the harness 41 from the rear end of the harness guide tube 42 to the fastener 45 is stable, and even when the backrest B moves it is possible to suppress a load acting on the harness 41.

As is described above, in accordance with the embodiment of the present invention, since the heater H is incorporated into the backrest B, and the harness 41 connected to the heater H is connected to the power supply Ba through the interior of the seat main body S, although the backrest B is of a movable type, an operation of maneuvering the wiring of the harness 41 becomes easy, and the harness 41 can be shortened.

Furthermore, because of the harness guide tube 42 guiding the harness 41, it is possible to prevent the harness 41 from interfering with or being caught by another object, the harness 41 is not exposed between the backrest B and the seat main body S, and it is thus possible to improve the appearance and enhance the product value.

Moreover, because of the harness retaining part 43 at the rear end of the harness guide tube 42, it is possible to easily fix a part, extending from the harness guide tube 42, of the harness 41, and it is thus possible to prevent the harness 41 from interfering with or being caught by another object.

Furthermore, since the harness guide tube 42 is provided between the two pipe frames 12 and 12 guiding the fore-and-aft movement of the backrest B with respect to the seat main body S, it is possible to dispose the harness 41 by utilizing a dead space between the two pipe frames 12 and 12 and, moreover, it is possible to shorten the harness 41 by placing it along the direction of movement of the backrest B.

The harness guide tube 42 can be disposed compactly within a confined space without interfering with the lock mechanism R.

Moreover, since the harness 41 extending from the harness guide tube 42 is mounted on a mounting part provided on the lower face of the lock cover 22 of the lock mechanism R, the shape of the harness 41 from the harness guide tube 42 to the mounting part can be stabilized, and even when the backrest B moves a load acting on the harness 41 can be suppressed.

Furthermore, because of the guide part 15 of the waterproof guide frame G provided on the seat main body S, it is possible to suppress as much as possible the entry of water such as rain water, which has entered via the opening 1a having the pipe frame 12 connected to the backrest B extending therethrough, between the skin material 3 and the seat bottom 1 of the seat main body S and soaking of the cushion material 2, and the water can be discharged to the reverse face side of the seat main body S through the guide member 15.

Since the skin material 3 is supported by the support face 17 of the waterproof guide frame G, it is possible to suppress movement or lifting of the skin material 3 and put the skin material 3 and the seat bottom 1 in intimate contact with each other, thus preventing a gap from occurring therebetween.

Since the guide part 15 of the waterproof guide frame G is tubular, this guide part 15 extends through the skin material 3 and the seat bottom 1 of the seat main body S, the seepage of water through the gap therebetween is suppressed, and even when the seat main body S experiences vibration from the vehicle body, water can be discharged by smoothly guiding it toward the reverse face of the seat bottom 1.

Since the guide part 15 of the waterproof guide frame G is linked via the support face 17, it is possible to retain the skin material 3 of the seat main body S by means of the support face 17 linked to the guide member 15, and the skin material 3 can be supported stably over a wide range.

Since the support face 17 of the waterproof guide frame G is formed so as to be wider than the gap between the two guide parts 15 and 15, it is possible to support the skin material 3 stably over a still wider range.

Since the engagement portions 15a and 15b engaging with the reverse face of the seat bottom 1 of the seat main body S are formed integrally with an end part, on the seat main body S, of the guide part 15, it is possible to fix the guide part 15 to the seat main body S without employing another fixing means such as a screw.

Since the guide part 15 is formed into a tubular shape, the engagement portions 15a and 15b are provided at positions that avoid its lower part, and the engagement portions 15a and 15b have the claw piece 15a and the slits 15b on opposite sides of the claw piece 15a, it is possible to improve the ease of assembly of the engagement portions 15a and 15b on the seat main body S, and seepage of water through the gap of the engagement portions 15a and 15b can be suppressed reliably.

Since the operating member 30 of the lock plate 21 of the lock mechanism R for the backrest B is provided further outside than the guide part 15, and the operating terminal 30a of the operating member 30 extends outward beyond the terminal of the seat main body S, it is possible to release the lock of the lock mechanism R by pulling the operating member 30 without lifting up the seat main body S.

Since the operating space 33 is formed between the terminal of the seat main body S and the cowling C covering the vehicle body, and the operating terminal 30a of the operating member 30 extends to the operating space 33, it is possible to house the operating member 30 in the operating space 33.

Since the guide tube 24, which is made of a synthetic resin, is provided in the lock bracket 20 of the lock mechanism R, and the mounting frame 12 connected to the backrest B is slidably inserted through the guide tube 24, the ease of operation in adjusting the position of the backrest B is improved, and backlash between the backrest B and the lock mechanism R can be suppressed.

An embodiment in which guiding and protecting means P for the harness 41 that guides fore-and-aft movement of the harness 41 and prevents the harness 41 from interfering with a vehicle body BO is provided beneath the seat main body S is now explained by reference to FIGS. 18 to 22.

In this embodiment, depending on movement of the backrest B in the fore-and-aft direction on the lower side of the seat main body S, the position of the harness 41 moving in the fore-and-aft direction can be restricted and the harness 41 can be protected.

Figure 18:
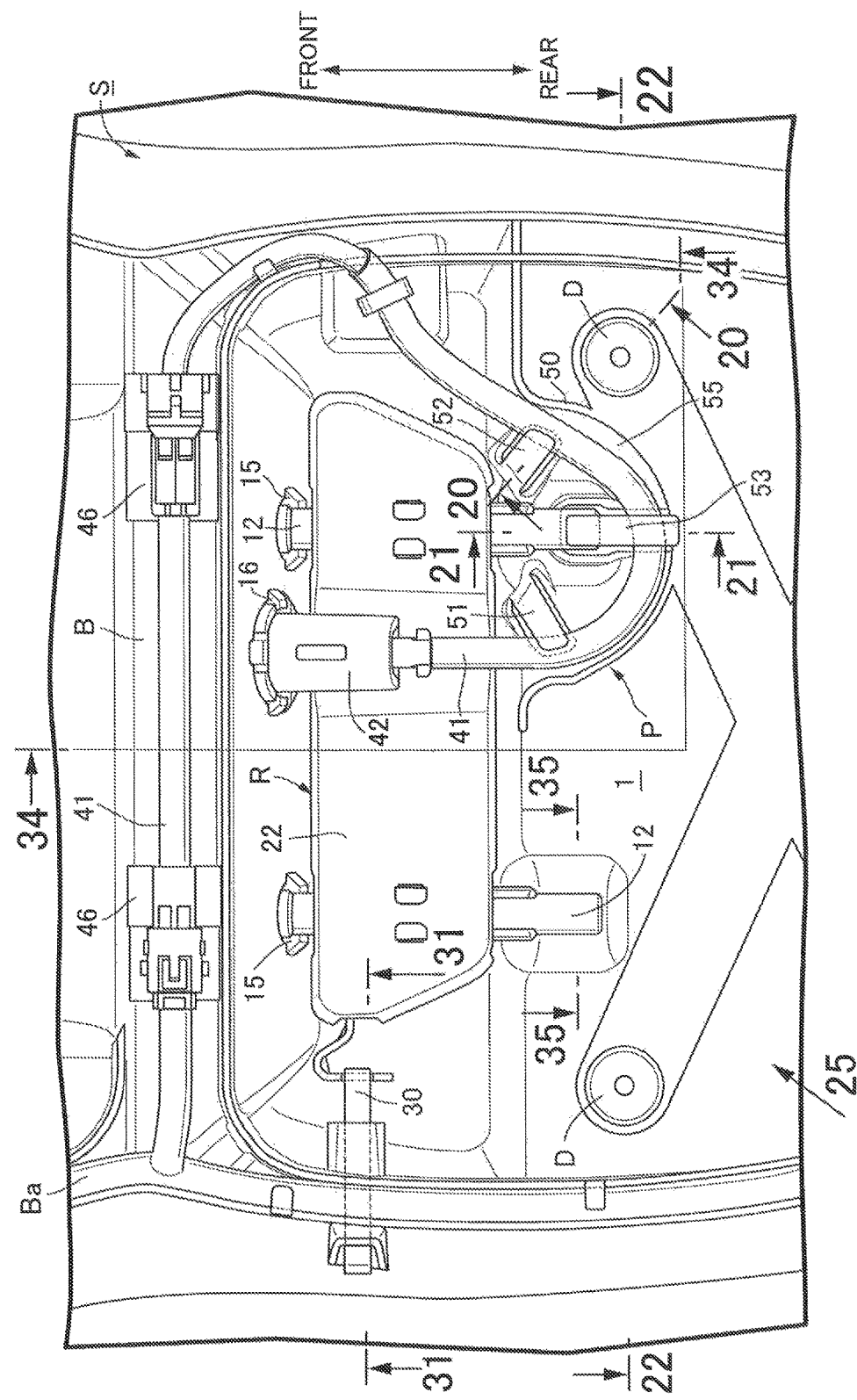
FIG. 18 is a bottom view of a seat device equipped with harness guiding and protecting means (when harness most backward).
Figure 19:
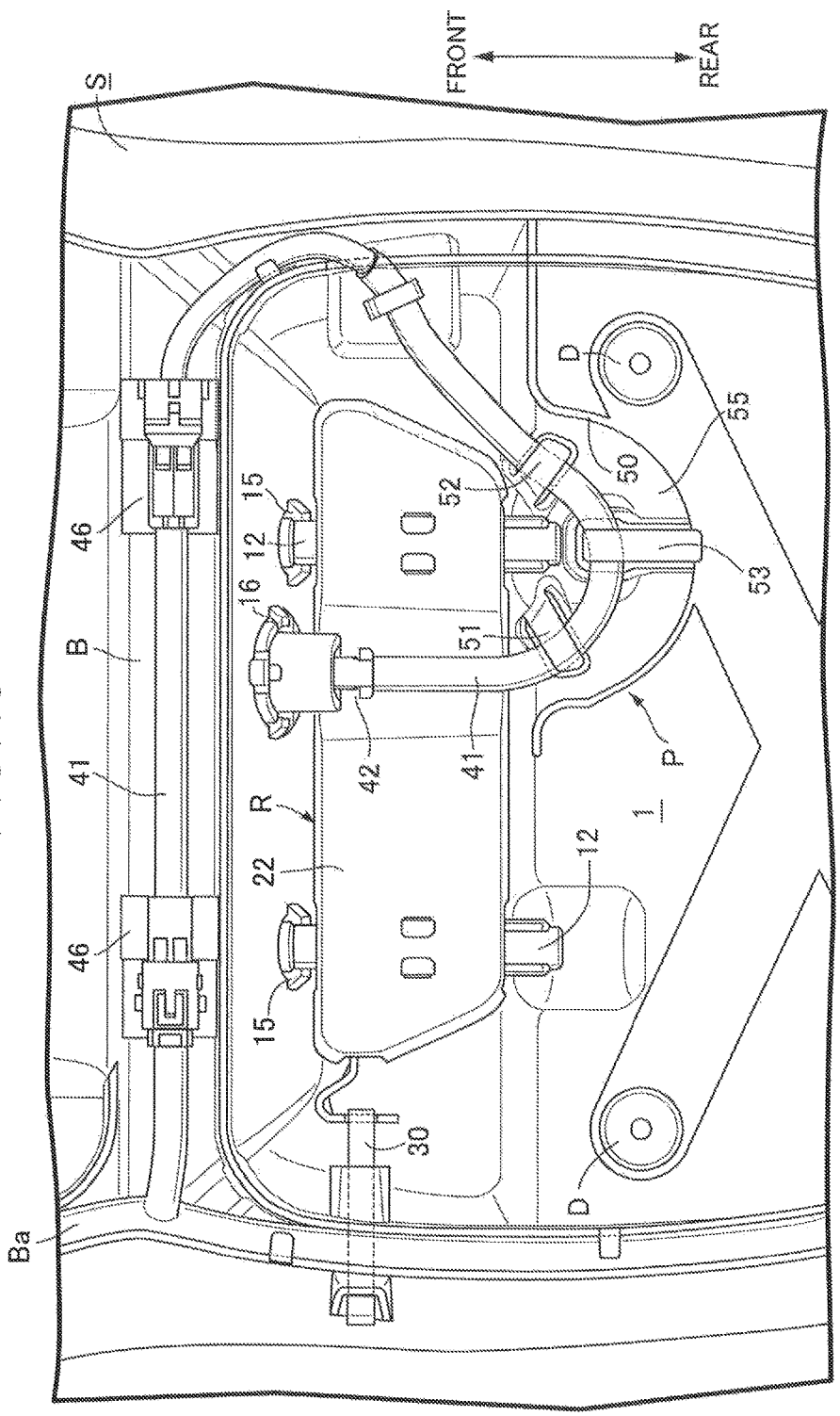
FIG. 19 is a bottom view of the seat device equipped with the harness guiding and protecting means (when harness most forward).

As shown in FIGS. 18 and 19, the harness 41 extending from the harness guide tube 42 branches via a pair of couplers 46 after going through guiding and protecting means P, which is described later, a front side of the harness 41 is connected to the power supply Ba, and a rear side thereof is connected to a heater (not illustrated) for a rear seat.

FIG. 18 shows a state in which the harness 41 has moved to the most rearward in the vehicle, and FIG. 19 shows a state in which the harness 41 has moved to the most forward in the vehicle.

Figure 20:
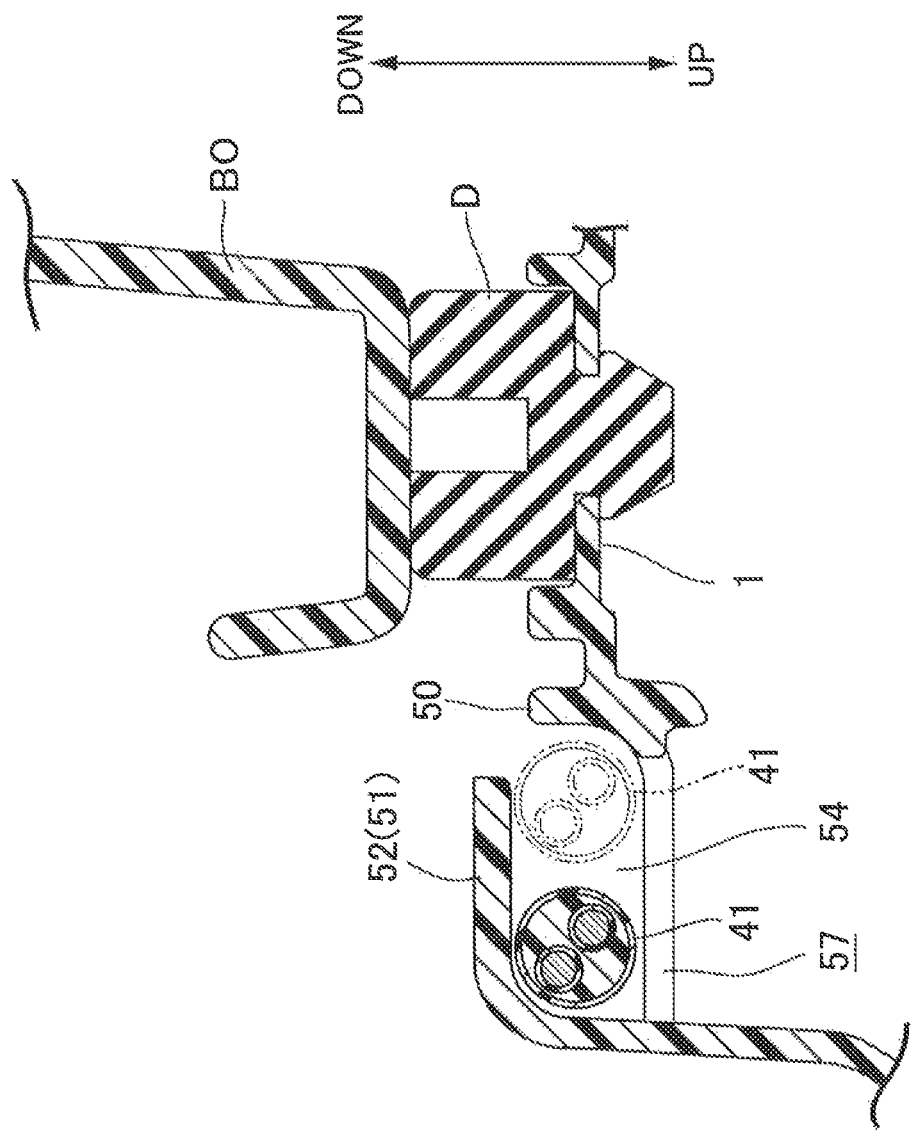
FIG. 20 is an enlarged sectional view along line 20-20 in FIG. 18.

A harness guide rib 50 guiding the harness 41 is downwardly provided integrally with the lower face of the seat bottom 1 of the seat main body S. This harness guide rib 50 is formed into a semicircular shape when viewed from above so as to oppose the curved part of the harness 41. Left and right harness retaining claws 51 and 52 are formed integrally with the seat bottom 1 so as to oppose left and right parts of the harness guide rib 50. As shown in FIG. 20, the left and right harness retaining claws 51 and 52 are formed by integrally bending from the seat bottom 1 toward the harness 41 in order to guide the harness 41 and form a housing recess part 54 for the harness in cooperation with the harness guide rib 50, and the housing recess part 54 guides and protects the harness 41 on the left and right harness retaining claws 51 and 52 so that it can move, an opening 57 of the seat bottom 1 communicating with the housing recess part 54. Furthermore, as shown in FIGS. 21 and 22, a semicircular housing recess part 55 surrounded by the harness guide rib 50 is formed in the seat bottom 1, a middle harness retaining claw 53 is formed integrally with the harness guide rib 50 so as to go toward the housing recess part 55, and the middle harness retaining claw 53 and the seat bottom 1 guide and protect the harness 41 housed within the housing recess part 55 so that it can move.

Harness guiding and protecting means P thus formed from the harness guide rib 50 and the left, right, and middle harness retaining claws 51, 52, and 53 guides the harness 41 so as to follow the fore-and-aft movement of the backrest B, and it is therefore possible to suppress stress acting on the harness 41, and it is also possible to prevent the harness 41 from interfering with the vehicle body BO.

As shown in FIGS. 18 to 22, a plurality of mounting dampers D for supporting the seat bottom 1 on the vehicle body BO are mounted on the seat bottom 1, and since the harness guide rib 50 is present at a position lower than the mounting damper D when viewed from the reverse face (high position when viewed from the vehicle body BO side), the harness guide rib 50 can be set in a desired space without interfering with the vehicle body BO.

Figure 21:
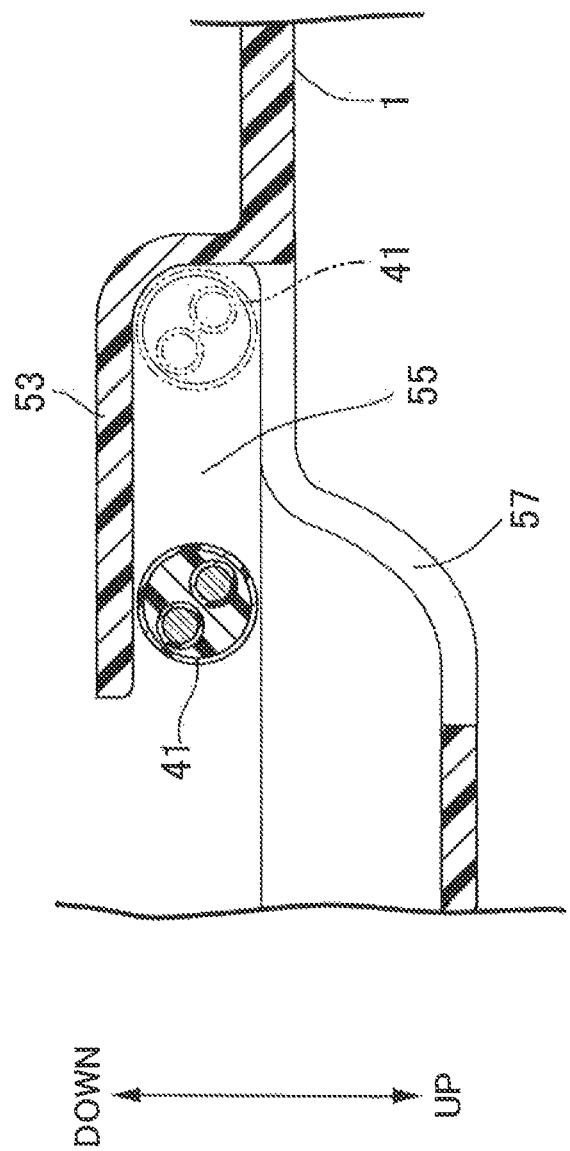
FIG. 21 is an enlarged sectional view along line 21-21 in FIG. 18.
Figure 22:
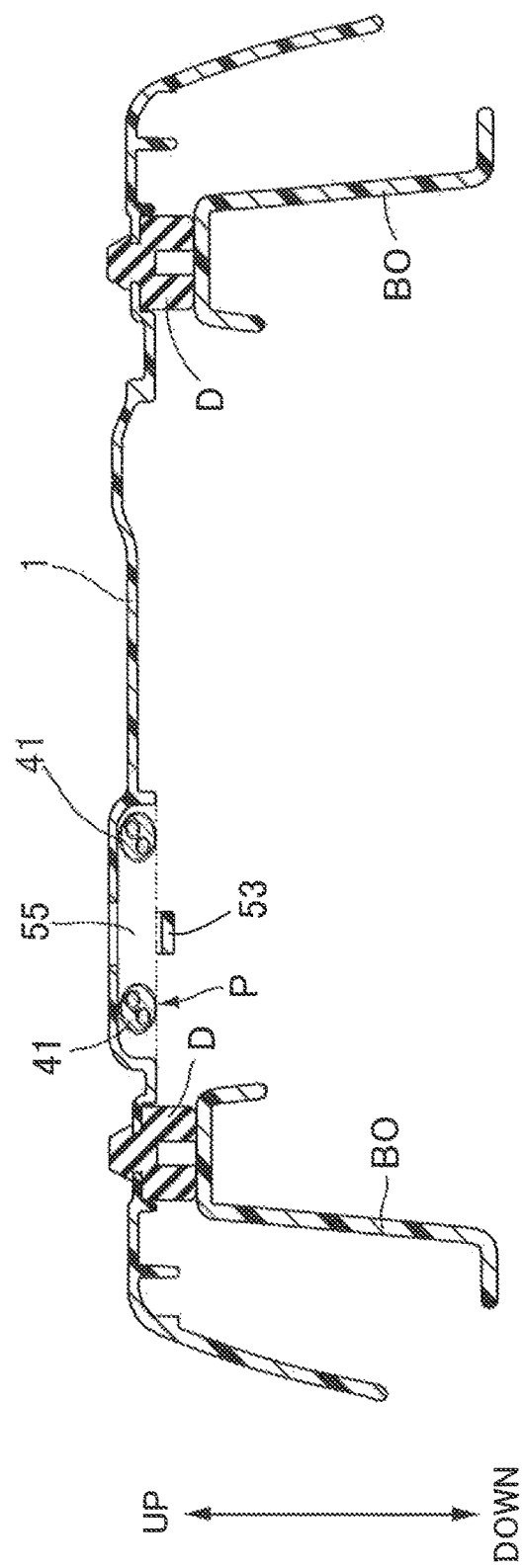
FIG. 22 is an enlarged sectional view along line 22-22 in FIG. 18.

Moreover, in this embodiment, as shown in FIGS. 20 and 21, the hole 57 opens in the seat bottom 1 so as to be continuous with the harness guide rib 50, thus making it easy to mold the harness guide rib 50.

Figure 24:
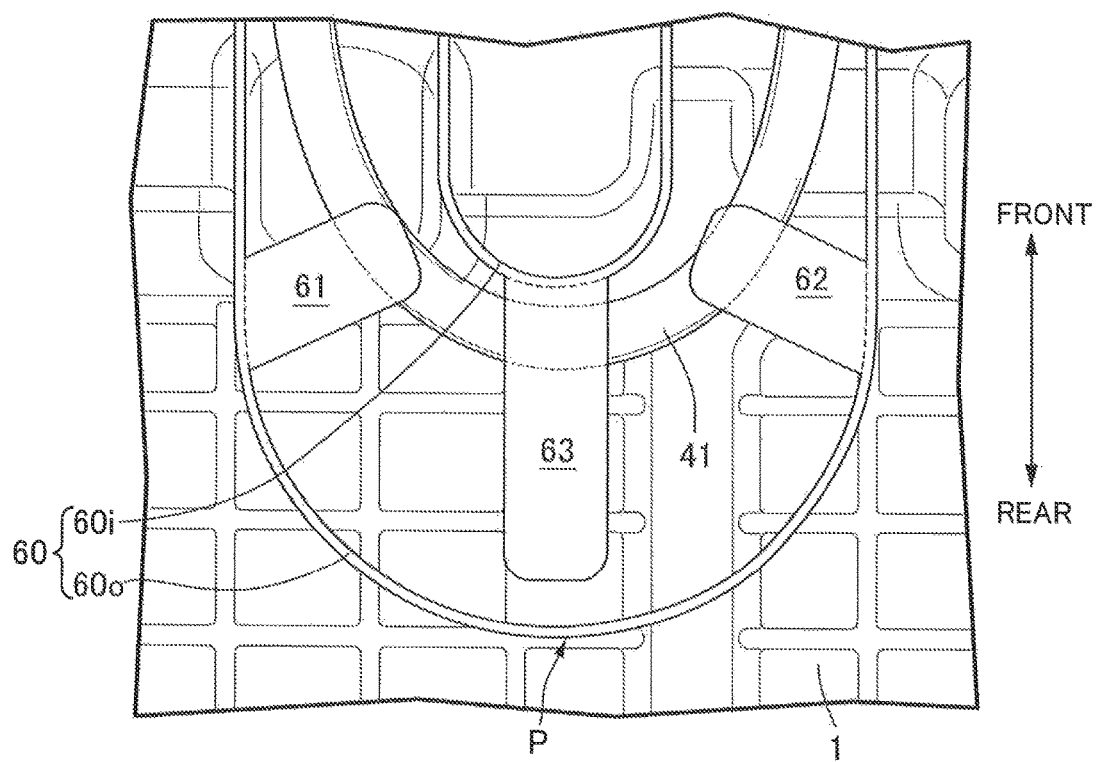
FIG. 24 is a bottom view of the harness guiding and protecting means (when harness most forward) (the other embodiment).

FIGS. 23 and 24 show another embodiment of the harness guiding and protecting means P.

FIG. 23 shows a state in which the harness 41 has moved to the most rearward in the vehicle, and FIG. 24 shows a state in which the harness 41 has moved to the most forward in the vehicle.

As shown in FIG. 23 (a) and (b), a harness guide rib 60 for guiding and protecting the harness 41 is downwardly provided integrally with the lower face of the seat bottom 1 of the seat main body S. The harness guide rib 60 is formed from inside and outside guide ribs 60i and 60o having a predetermined vertical width and having a horseshoe shape when viewed from above. A middle harness retaining claw 63 extending toward the outside guide rib 60o is formed integrally with the inside guide rib 60i so as to be substantially parallel to the seat bottom 1, and left and right harness retaining claws 61 and 62 extending toward the inside guide rib 60i are formed integrally with left and right parts of the outside guide rib 60o so as to be substantially parallel to the seat bottom 1. The inside guide rib 60i and the outside guide rib 60o form a harness housing part 64 in cooperation with the seat bottom 1, thus guiding the curved part of the harness 41 so that it can move. When there is fore-and-aft movement due to the backrest B being adjusted, the harness 41 is guided by the seat bottom 1 and the harness guide rib 60 and protected while interference with the vehicle body BO is eliminated.

A reinforcing rib 65 is formed in a location, corresponding to the harness housing part 64, on the seat bottom 1, thus reinforcing the seat bottom 1.

Figure 25:
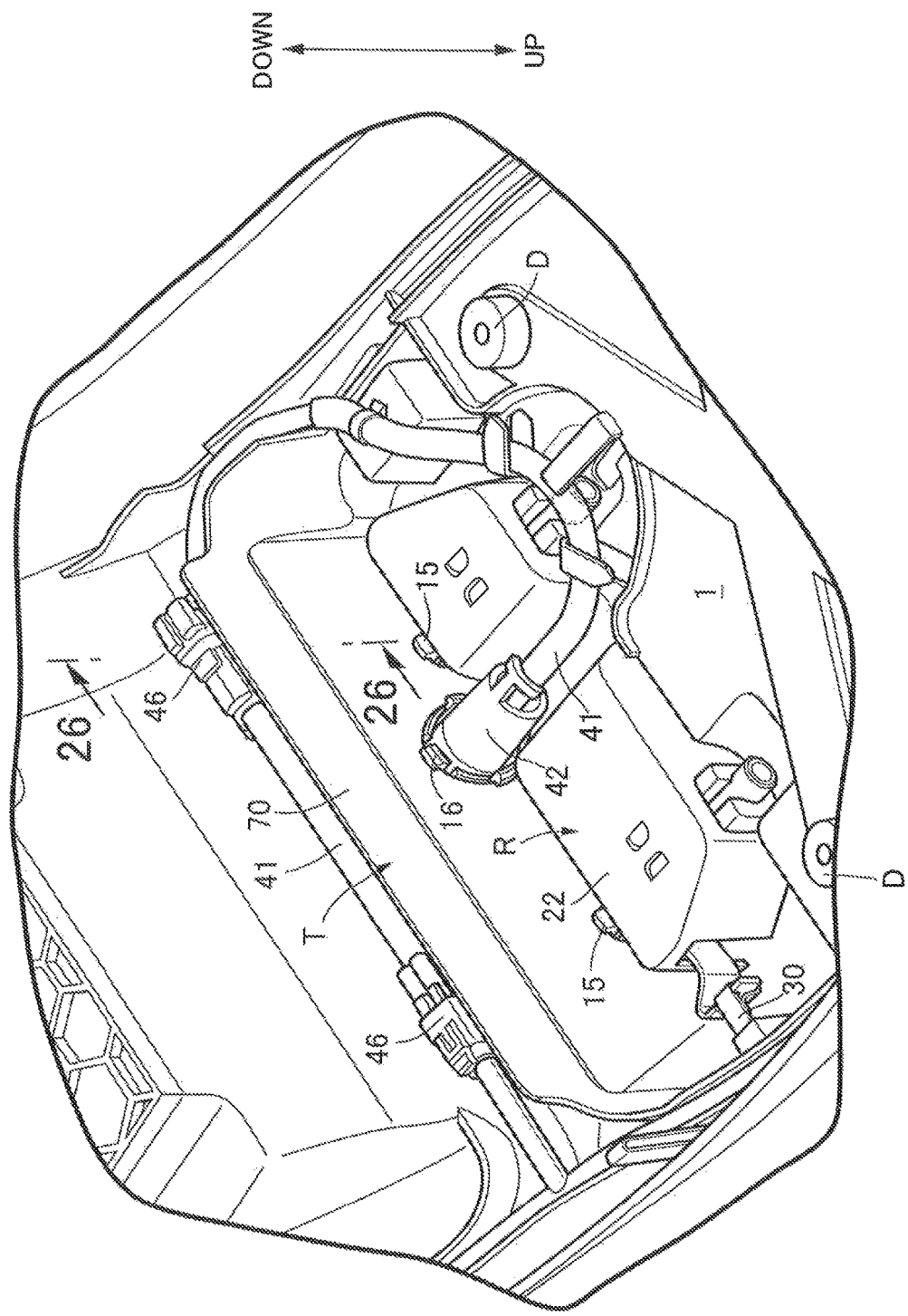
FIG. 25 is a bottom perspective view of a seat main body equipped with coupler water-seepage prevention means.
Figure 26:
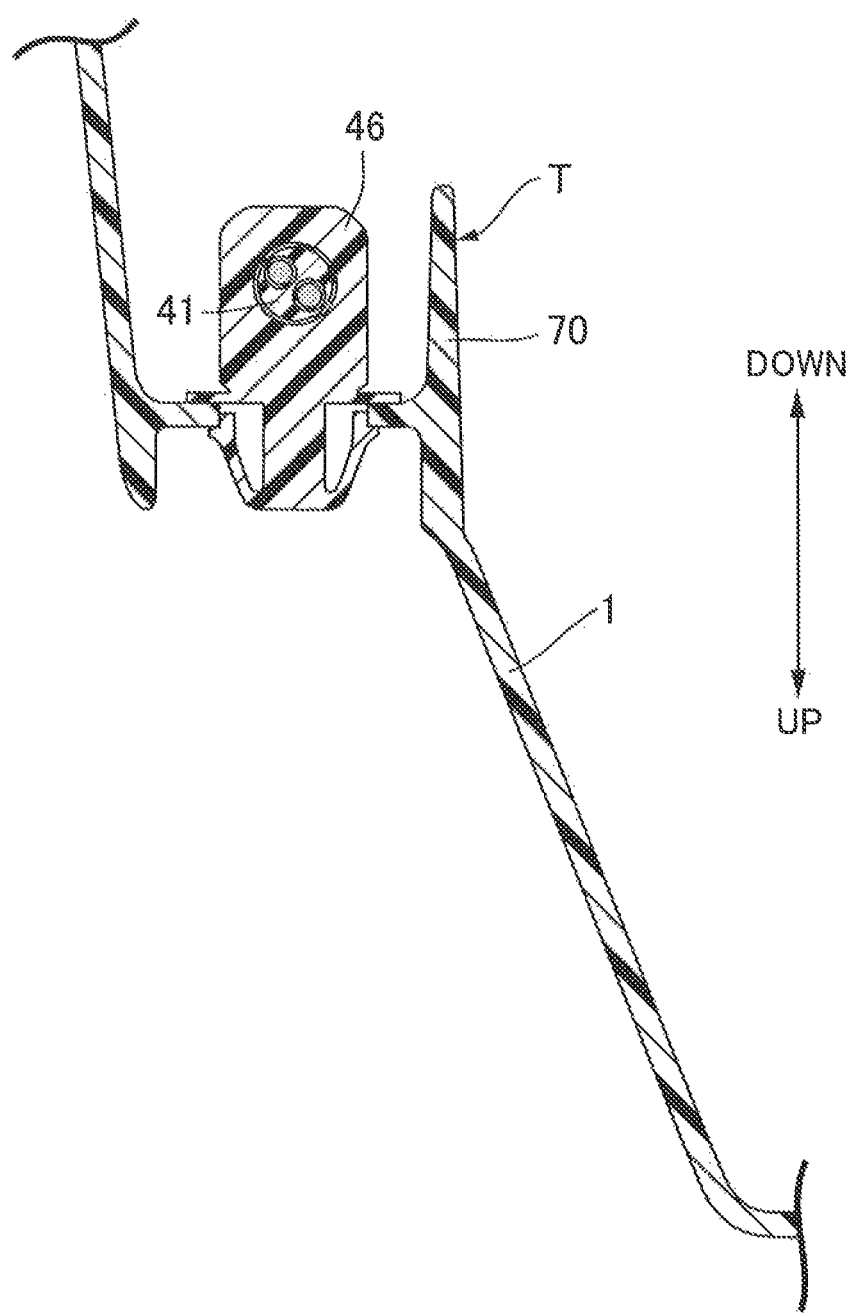
FIG. 26 is a sectional view along line 26-26 in FIG. 25.

Furthermore, FIGS. 25 and 26 show an embodiment which employs coupler water-seepage prevention means T that prevents water from seeping into a coupler (joint) 46 providing a connection between the harness 41 connected to the heater H and a wire connected to the power supply (battery) Ba.

Figure 30:
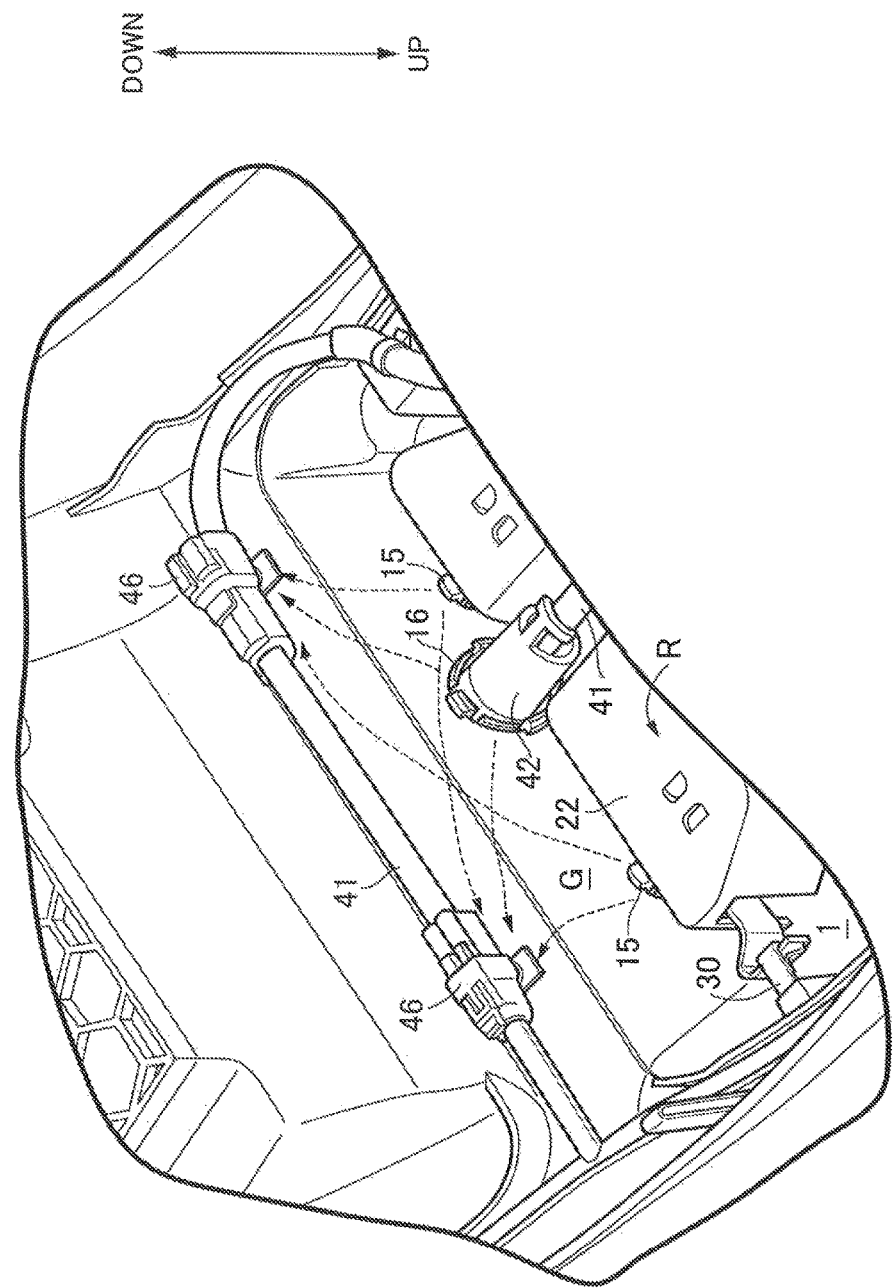
FIG. 30 is a bottom perspective view of a seat device having no coupler water-seepage prevention means.

If the coupler water-seepage prevention means T were not employed, as shown in FIG. 30, water leaking past gaps of the harness guide part 16, which opens in the waterproof guide frame G and through which the harness guide tube 42 passes, and the guide parts 15 and 15, which open in the waterproof guide frame G and through which the pipe frames 12 and 12 pass, might flow along a wall face of the seat bottom 1 and seep into the coupler 46 as shown by the arrow in the same figure.

As a measure for preventing water from seeping into the coupler 46, as shown in FIGS. 25 and 26, a waterproof rib 70 having a rectangular shape that is long in the lateral direction is vertically fixed to the wall face of the seat bottom 1 so as to cover the coupler 46, and as a result water that has leaked past the gaps of the harness guide part 16 and the guide parts 15 and 15 can be blocked by the waterproof guide rib 70 and prevented from seeping into the coupler 46.

Figure 27:
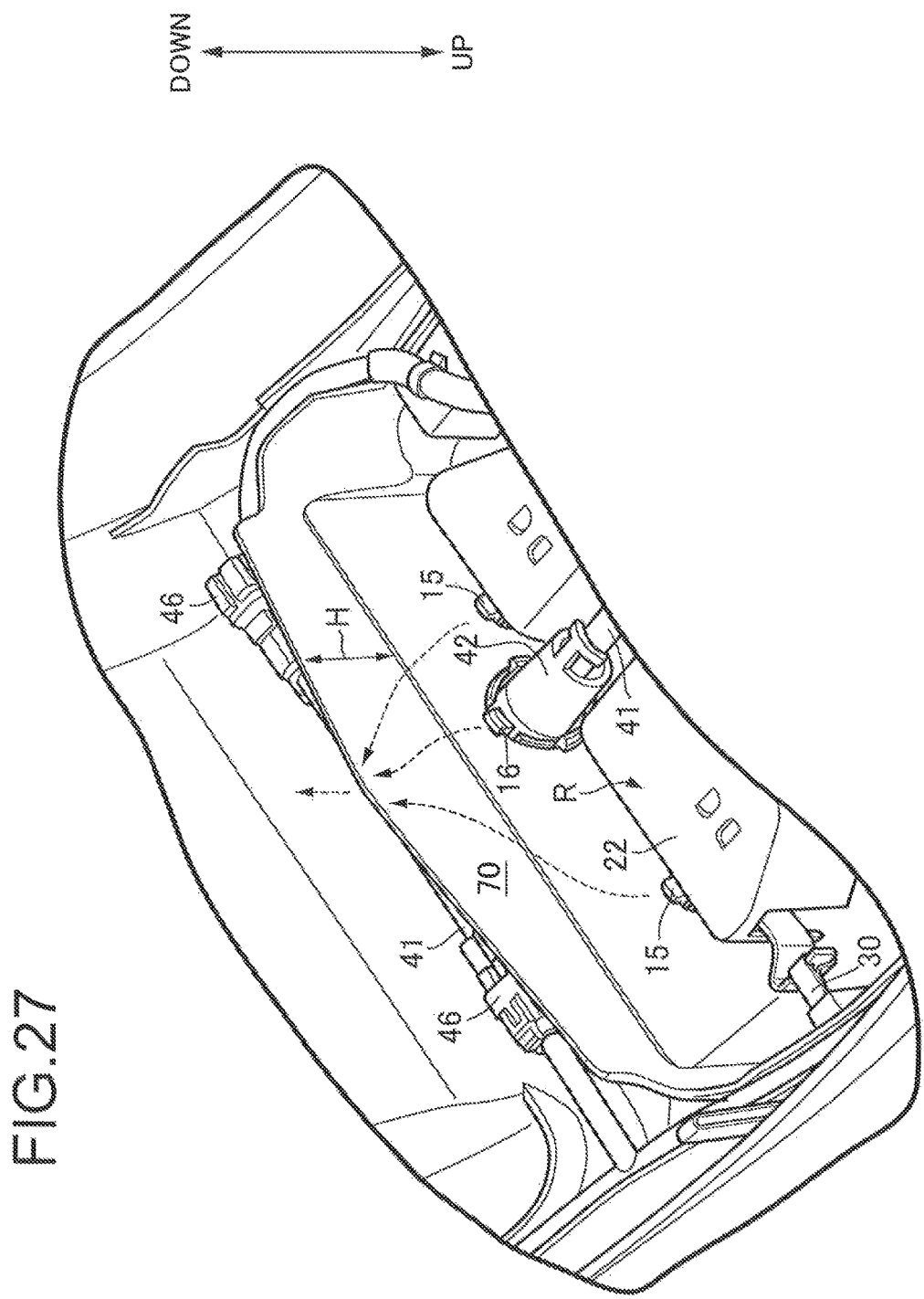
FIG. 27 is a perspective view of coupler water-seepage prevention means (another modified example).
Figure 28:
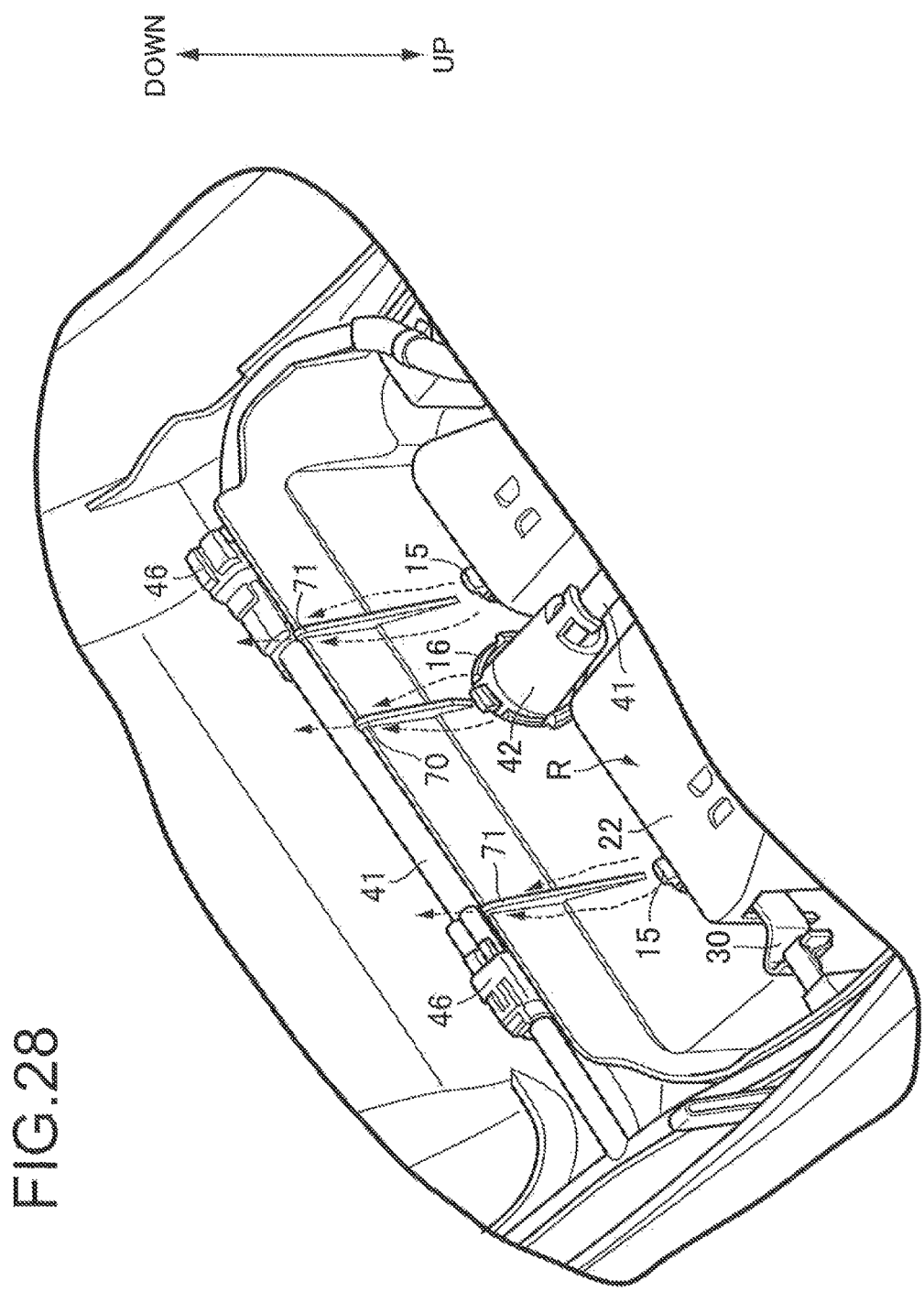
FIG. 28 is a perspective view of coupler water-seepage prevention means (another modified example).
Figure 29:
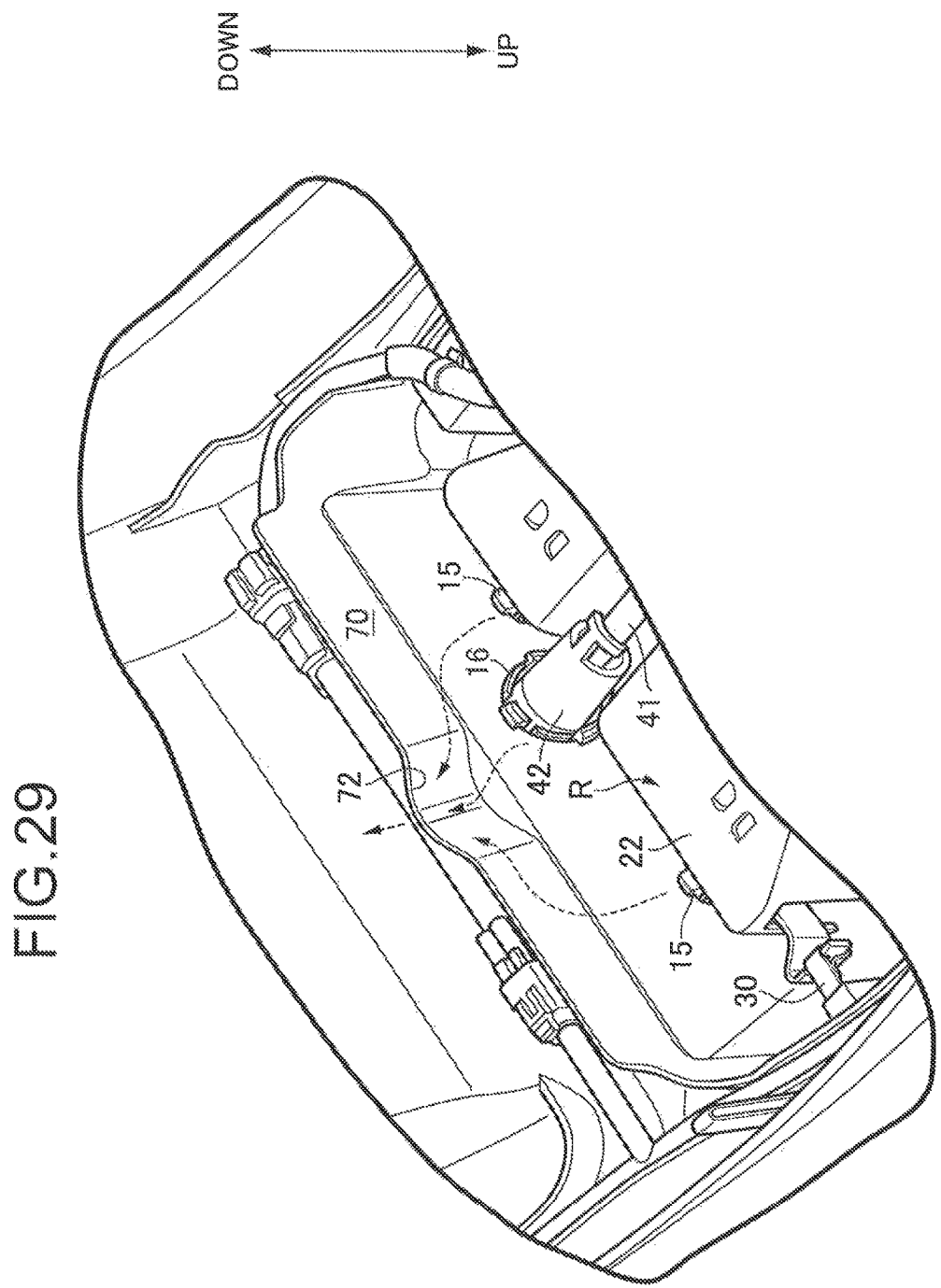
FIG. 29 is a perspective view of coupler water-seepage prevention means (another modified example).

As shown in FIG. 27 the waterproof rib 70 may be changed in height H in order to guide leaked water, as shown in FIG. 28 the waterproof rib 70 may be provided with a guide projection 71 for guiding leaked water in a predetermined direction, and as shown in FIG. 29 the waterproof rib 70 may be provided with a concave part 72 that collects leaked water and guides it downward.

Furthermore, the waterproof rib 70 can cover the coupler 46 and protect it.

Figure 31:
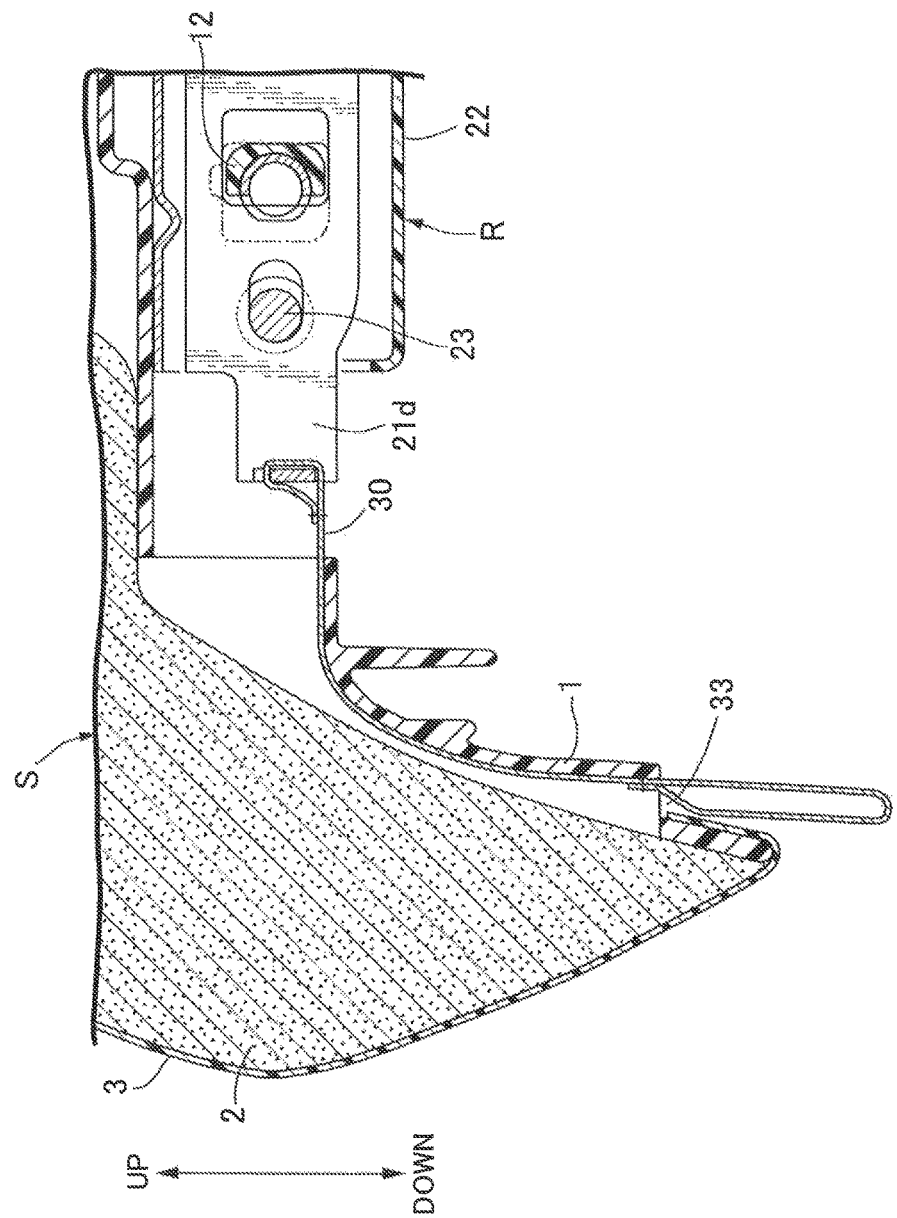
FIG. 31 is an enlarged sectional view of a strap mounting structure along line 31-31 in FIG. 18.

Moreover, FIG. 31 shows a modified example of the structure for positioning the strap 30 as an operating member. In accordance with this modified example, the reliability and operability when the strap 30 is operated is further enhanced.

As shown in FIG. 31, the strap 30, which is a flexible band, is bound via its inner end to the lock lever 21*d* of the lock plate 21, extends substantially horizontally toward the seat main body S, then extends downward through between the seat main body S and the seat bottom 1, and extends downward through the bottom hole (operating space) 33 of the seat bottom 1 and beneath it. An intermediate part of the strap 30 follows the surface of the seat bottom 1 and is guided by the seat bottom 1.

When the strap 30 is pulled, the pulling force is received by the seat bottom 1, and the lock plate 21 can be operated smoothly and lightly with less resistance.

Figure 32:
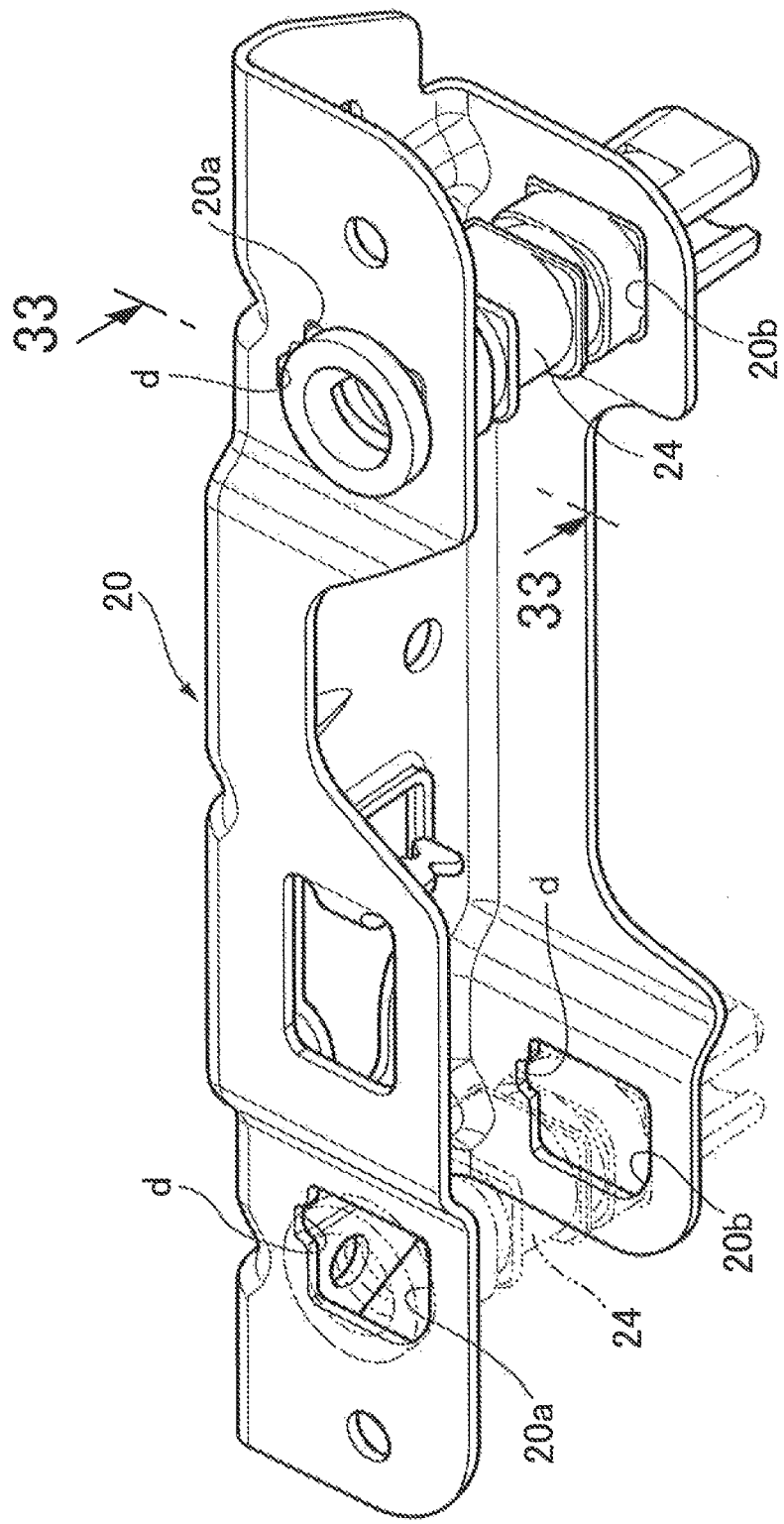
FIG. 32 is a perspective view of a lock bracket (another modified example).
Figure 33:
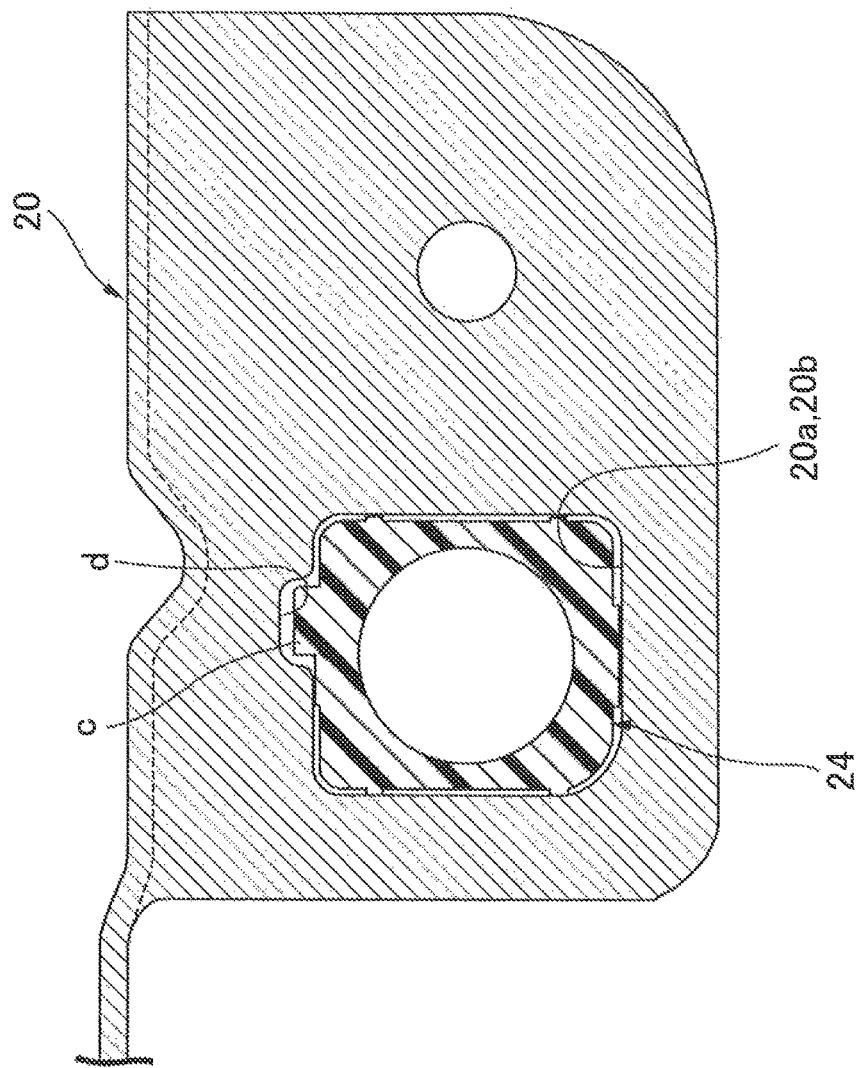
FIG. 33 is an enlarged sectional view along line 33-33 in FIG. 32.

Furthermore, FIGS. 32 and 33 show a modified example of the lock bracket 20 and guide tube 24 of the lock mechanism R. In this modified example, erroneous assembly of the pair of guide tubes 24 on the lock bracket 20 is prevented, a recess part d for preventing erroneous assembly being formed in one side of rectangular insertion holes 20*a* and 20*b* opened in front and rear walls of left and right parts of the lock bracket 20; on the other hand portions, corresponding to the insertion holes 20*a* and 20*b*, of opposite end parts in the longitudinal direction of the guide tube 24 are formed into the same rectangular shape as the shape of the insertion holes 20*a* and 20*b*, and a projection part c engaging with the recess part d for preventing erroneous assembly is formed on one side of the portions.

When the pair of guide tubes 24 are each inserted and fixed into the insertion holes 20*a* and 20*b* on the left and right parts of the lock bracket 20, the recess and projection parts d and c for preventing erroneous assembly formed thereon are engaged with each other, thus preventing erroneous assembly of the pair of guide tubes 24 on the lock bracket 20.

Figure 34:
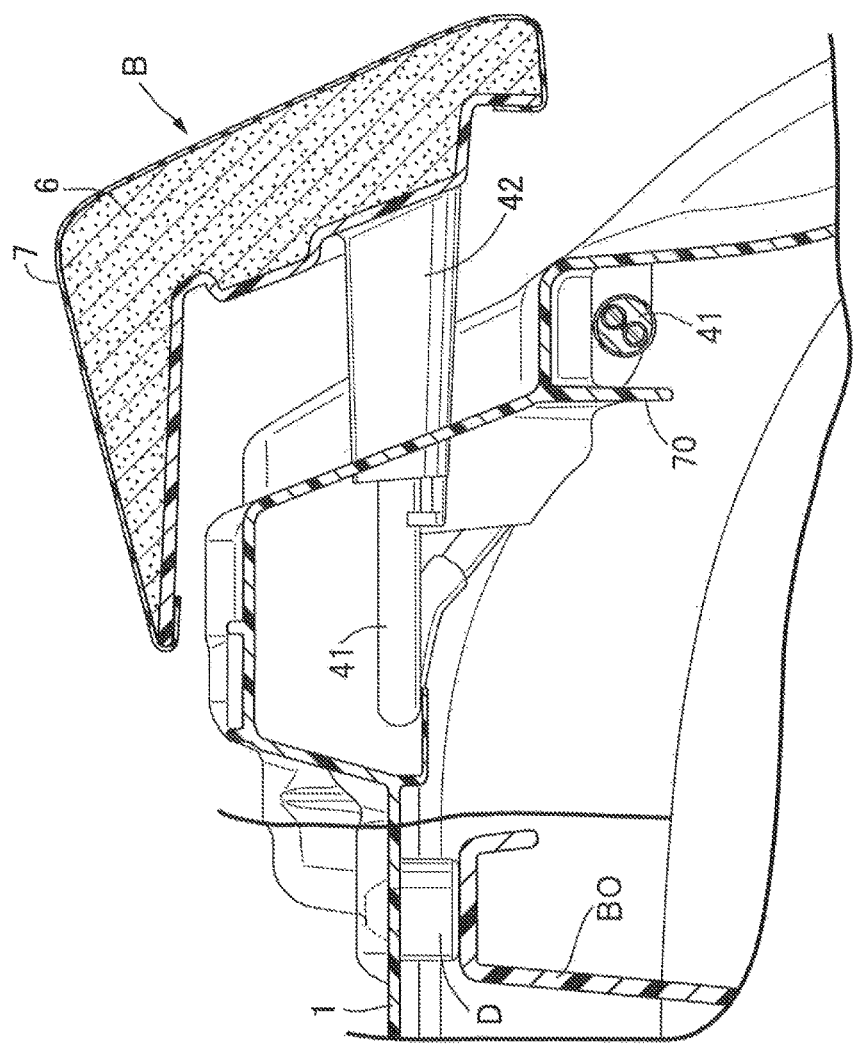
FIG. 34 is an enlarged sectional view along line 34-34 in FIG. 18.

As shown in FIG. 34, the harness 41 inserted through the harness guide tube 42 is laid out at a higher position than a vehicle body mounting face of the mounting damper D; the harness 41 does not interfere with the vehicle body BO, and the degree of freedom in mounting is increased.

Furthermore, as shown in FIGS. 35 and 36, a clearance part 75 is formed in a recess part 74 on the bottom of the seat bottom 1, the recess part 74 corresponding to free ends of the two pipe frames 12 and 12 linked to the backrest B and slidably extending through the lock mechanism R, and interference between the free ends of the pipe frames 12 and 12 and the seat bottom 1 due to the fore-and-aft movement of the backrest B can be avoided.

The present invention is not limited to the embodiments above and may be modified in a variety of ways as long as the modifications do not depart from the spirit and scope thereof.

For example, in the embodiments, a case in which the seat device of the present invention is implemented in a scooter type two-wheeled motor vehicle is explained, but this may of course be implemented in a two-wheeled motor vehicle of another type. Furthermore, instead of the lock mechanism R of the backrest of the embodiments, a conventionally known mechanism may be used.

The invention claimed is:

1. A two-wheeled motor vehicle seat device in which a backrest is provided on a seat main body mounted on a vehicle body so that the backrest can move in a fore-and-aft direction thereof,
wherein a heater is incorporated into the backrest such that the heater can move together with the backrest in the fore-and-aft direction relative to the seat main body, and a harness connected to the heater is passed through an interior of the seat main body and connected to a power supply.

2. The two-wheeled motor vehicle seat device according to claim 1, wherein accompanying a fore-and-aft movement of the backrest, the harness is arranged so as to move in the same direction, and the seat main body is provided with guiding and protecting means that guides movement of the harness and protects the harness.

3. The two-wheeled motor vehicle seat device according to claim 1, wherein a harness guide tube is provided integrally with a backrest bottom of the backrest, the harness guide tube having the harness, connected to the heater, inserted therethrough and guiding the harness, and the harness guide tube passes through a seat bottom of the seat main body and extends within the seat main body.

4. The two-wheeled motor vehicle seat device according to claim 3, wherein a harness retaining part that retains the harness is provided at a rear end of the harness guide tube.

5. The two-wheeled motor vehicle seat device according to claim 3, wherein the harness guide tube is provided in a space of a mounting frame that guides movement in a fore-and-aft direction of the backrest with respect to the seat main body.

6. A two-wheeled motor vehicle seat device in which a backrest is provided on a seat main body mounted on a vehicle body so that the backrest can move in a fore-and-aft direction thereof,
wherein a heater is incorporated into the backrest and a harness connected to the heater is passed through an interior of the seat main body and connected to a power supply,
wherein a harness guide tube is provided integrally with a backrest bottom of the backrest, the harness guide tube having the harness, connected to the heater, inserted therethrough and guiding the harness, and the harness guide tube passes through a seat bottom of the seat main body and extends within the seat main body, and
wherein the harness guide tube is received by a recess portion formed in a lock cover of a lock mechanism that locks the backrest to the seat main body.

7. A two-wheeled motor vehicle seat device in which a backrest is movably provided on a seat main body mounted on a vehicle body, wherein an opening is provided in the seat main body, the opening opening so as to straddle a seat bottom and a skin material of the seat main body, a mounting frame linked to the backrest extending through the opening, and the backrest being capable of being moved relative to the seat main body by operation of the mounting frame, and a waterproof guide frame is provided on the seat main body, a guide part being provided on the waterproof guide frame, and the guide part extending within the opening while straddling a surface of the skin material and a reverse face of the seat bottom.

8. The two-wheeled motor vehicle seat device according to claim 7, wherein a support face is formed on the waterproof guide frame, the support face opposing an outer face of the seat main body and supporting the skin material.

9. The two-wheeled motor vehicle seat device according to claim 8, wherein the guide part of the waterproof guide frame comprises a plurality thereof, and the guide parts are linked by the support face.

10. The two-wheeled motor vehicle seat device according to claim 8, wherein the guide part of the waterproof guide frame comprises two thereof, and the support face is wider than a gap between the two guide parts.

11. The two-wheeled motor vehicle seat device according to claim 7, wherein the guide part of the waterproof guide frame has a tubular shape.

12. The two-wheeled motor vehicle seat device according to claim 7, wherein an engagement portion is formed integrally with an end part, on the seat main body side, of the guide part provided in the opening, the engagement portion engaging with the reverse face of the seat bottom of the seat main body.

13. The two-wheeled motor vehicle seat device according to claim 7, wherein an operating member is provided on a lock plate of a lock mechanism for the backrest further outside than the guide part, and an operating terminal of the operating member extends outward beyond a terminal of the seat main body.

14. The two-wheeled motor vehicle seat device according to claim 6, wherein the harness guide tube is provided to be distanced from the recess portion.

15. The two-wheeled motor vehicle seat device according to claim 6, wherein the recess portion is formed in a lower face of the lock cover.

16. The two-wheeled motor vehicle seat device according to claim 6, further comprising frame members for guiding movement of the backrest relative to the seat main body in the fore-and-aft direction, wherein the recess portion is provided between the frame members.

* * * * *